United States Patent
Raghavan et al.

(10) Patent No.: US 11,729,789 B2
(45) Date of Patent: Aug. 15, 2023

(54) BEAM CORRELATION ACROSS FREQUENCY BANDS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Yu-Chin Ou, San Diego, CA (US); Kobi Ravid, Closter, NJ (US); Ozge Koymen, Princeton, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/367,214

(22) Filed: Jul. 2, 2021

(65) Prior Publication Data

US 2022/0070834 A1 Mar. 3, 2022

Related U.S. Application Data

(60) Provisional application No. 63/070,122, filed on Aug. 25, 2020.

(51) Int. Cl.
*H04W 72/23* (2023.01)
*H04B 7/08* (2006.01)
(Continued)

(52) U.S. Cl.
CPC ............ *H04W 72/23* (2023.01); *H04B 7/086* (2013.01); *H04W 72/046* (2013.01); *H04W 72/0453* (2013.01)

(58) Field of Classification Search
CPC ........... H04W 72/042; H04W 72/0453; H04W 72/046; H04B 7/086; H04B 7/0695; H04B 7/088; H04L 5/0023; H04L 5/0048
See application file for complete search history.

(56) References Cited

U.S. PATENT DOCUMENTS

2002/0171583 A1* 11/2002 Purdy ................... H01Q 25/00
                                                      342/368
2016/0197709 A1*  7/2016 Shen .................... H04B 7/0697
                                                      370/329
(Continued)

FOREIGN PATENT DOCUMENTS

WO     WO-2019233418 A1    12/2019

OTHER PUBLICATIONS

International Search Report and Written Opinion—PCT/US2021/040461—ISA/EPO—dated Oct. 11, 2021.

*Primary Examiner* — Ayaz R Sheikh
*Assistant Examiner* — Debebe A Asefa
(74) *Attorney, Agent, or Firm* — Holland & Hart LLP/Qualcomm Incorporated

(57) ABSTRACT

Methods, systems, and devices for wireless communications are described that support beam correlation across frequency bands for beam selection in the event of a frequency switch. For example, a base station may determine a configuration indicating a mapping between a set of beam identifiers (IDs) and a set of angle coverage ranges for a set of frequency ranges which corresponds to a user equipment's (UE) operating frequencies. In some examples, the UE may undergo a frequency switch and switch from a first operating frequency to a second operating frequency. The UE may select a beam ID based on the mapping and communicate with the base station via the second operating frequency using a beam associated with the selected beam ID.

30 Claims, 19 Drawing Sheets

(51) Int. Cl.
*H04W 72/0453* (2023.01)
*H04W 72/044* (2023.01)

(56) References Cited

U.S. PATENT DOCUMENTS

2019/0053072 A1\* 2/2019 Kundargi ............. H04B 7/0413
2020/0037301 A1 1/2020 Park \* cited by examiner SSB$_5$ at 71GHz ----------
SSB$_5$ at 57 GHz ———
SSB$_4$ at 57 GHz ··········

CSIRS$_5$ at 71GHz ----------
CSIRS$_5$ at 57GHz ———
CSIRS$_4$ at 57GHz ··········

BEAM CORRELATION ACROSS FREQUENCY BANDS

CROSS REFERENCE

The present Application for Patent claims the benefit of U.S. Provisional Patent Application No. 63/070,122 by RAGHAVAN et al., entitled "BEAM CORRELATION ACROSS FREQUENCY BANDS," filed Aug. 25, 2020, assigned to the assignee hereof, and expressly incorporated by reference herein.

FIELD OF TECHNOLOGY

The following relates to wireless communications, including beam correlation across frequency bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may employ beam management techniques. For example, a base station may transmit a sequence of beams associated with different directions to a UE. The UE may select the beam with highest signal strength and report a beam identifier (ID) associated with the selected beam back to the base station. In some examples, the UE may be capable of operating within an upper millimeter wave band (e.g., 52.6 Gigahertz (GHz) to 71 GHz) over an ultrawide bandwidth range (14 GHz from for example, 57 to 71 GHz) utilizing a single radio frequency (RF) chain. A single RF chain may restrict the UE to using a single set of beam weights controlled by a single set of phase shifters and amplitude or gain control for communications with the base station, which may lead to inaccurate beam parameters or channel estimations across the ultrawide bandwidth.

SUMMARY

The described techniques relate to improved methods, systems, devices, and apparatuses that support beam correlation across frequency bands. Generally, the described techniques provide for a user equipment (UE) to utilize a physical mapping between beam identifiers (IDs) and beam angle coverage ranges to select a beam ID in the event of a frequency switch. For example, the UE may transmit an indication of a set of operating frequencies to the base station. In response, the base station may determine a mapping which indicates an association between beam IDs and angle coverage ranges for a set of frequency ranges which includes the set of indicated operating frequencies. The base station may transmit the mapping to the UE and in the event of a frequency switch, the UE may select a beam ID for subsequent communication with the base station based on the mapping.

A method of wireless communications at a UE is described. The method may include receiving, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, determining a frequency switch from a first operating frequency of the set of operating frequencies to a second operating frequency of the set of operating frequencies, and selecting a second beam ID of the set of beam IDs based on the frequency switch and the mapping, the selected second beam ID corresponding to the second operating frequency and a second angle coverage range based on the mapping.

An apparatus for wireless communications at a UE is described. The apparatus may include a processor, memory coupled with the processor, and instructions stored in the memory. The instructions may be executable by the processor to cause the apparatus to receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, determine a frequency switch from a first operating frequency of the set of operating frequencies to a second operating frequency of the set of operating frequencies, and select a second beam ID of the set of beam IDs based on the frequency switch and the mapping, the selected second beam ID corresponding to the second operating frequency and a second angle coverage range based on the mapping.

Another apparatus for wireless communications at a UE is described. The apparatus may include means for receiving, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, determining a frequency switch from a first operating frequency of the set of operating frequencies to a second operating frequency of the set of operating frequencies, and selecting a second beam ID of the set of beam IDs based on the frequency switch and the mapping, the selected second beam ID corresponding to the second operating frequency and a second angle coverage range based on the mapping.

A non-transitory computer-readable medium storing code for wireless communications at a UE is described. The code may include instructions executable by a processor to receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, determine a frequency switch from a first operating frequency of the set of operating frequencies to a second operating frequency of the set of operating frequencies, and select a second beam ID of the set of beam IDs based on the frequency switch and the mapping, the selected second beam ID corresponding to the second operating frequency and a second angle coverage range based on the mapping.

Some examples of the method, apparatuses, and non-transitory computer-readable medium described herein may further include operations, features, means, or instructions for identifying a set of beam weights for the second beam ID based on the configuration and the second operating frequency, where the set of beam weights may be indicated by the configuration, and receiving a signal from the base station based on the second beam ID and the set of beam weights.

Some examples of the method, apparatuses, and non-transitory computer-readable medium described herein may further include operations, features, means, or instructions for performing a set of beam search measurements associated with the base station based on the second beam ID, and communicating with the base station using the second beam ID based on the set of beam search measurements.

Some examples of the method, apparatuses, and non-transitory computer-readable medium described herein may further include operations, features, means, or instructions for preemptively performing a beam failure procedure based on the configuration and the frequency switch, where the second beam ID may be selected based on the beam failure procedure.

Some examples of the method, apparatuses, and non-transitory computer-readable medium described herein may further include operations, features, means, or instructions for determining that the set of operating frequencies may be supported by the UE, and transmitting an indication of the set of operating frequencies to the base station.

In some examples of the method, apparatuses, and non-transitory computer-readable medium described herein, receiving the configuration may include operations, features, means, or instructions for receiving an indication of the configuration in a system information block (SIB), a master information block (MIB), a radio resource control (RRC) message, a layer 1 signal, a layer 2 signal, a capability information message, or any combination thereof.

In some examples of the method, apparatuses, and non-transitory computer-readable medium described herein, receiving the configuration may include operations, features, means, or instructions for receiving the configuration as part of a start-up or initial acquisition procedure for the UE.

In some examples of the method, apparatuses, and non-transitory computer-readable medium described herein, each angle coverage range of the set of angle coverage ranges may be based on a global coordinate system, a local coordinate system, a configured coordinate system, or any combination thereof.

In some examples of the method, apparatuses, and non-transitory computer-readable medium described herein, each angle coverage range of the set of angle coverage ranges may be relative to a boresight of an antenna array of the base station or a boresight of an antenna array of the UE.

Some examples of the method, apparatuses, and non-transitory computer-readable medium described herein may further include operations, features, means, or instructions for determining a set of logical mappings associated with a set of indices for the set of beam IDs and a set of physical mappings associated with the set of angle coverage ranges based on the configuration, where the second beam ID may be selected based on the set of logical mappings and the set of physical mappings.

In some examples of the method, apparatuses, and non-transitory computer-readable medium described herein, the set of logical mappings corresponds to a first subset of the set of operating frequencies, and the set of physical mappings corresponds to a second subset of the set of operating frequencies.

In some examples of the method, apparatuses, and non-transitory computer-readable medium described herein, each of the set of beam IDs corresponds to a synchronization signal block (SSB), a channel state information reference signal (CSI-RS), a sounding reference signal (SRS), or any combination thereof.

In some examples of the method, apparatuses, and non-transitory computer-readable medium described herein, the at least one frequency band corresponds to a contiguous or non-contiguous set of frequency bands in a millimeter wave frequency range.

A method of wireless communications at a base station is described. The method may include transmitting, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, transmitting a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration, and transmitting a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

An apparatus for wireless communications at a base station is described. The apparatus may include a processor, memory coupled with the processor, and instructions stored in the memory. The instructions may be executable by the processor to cause the apparatus to transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration, and transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

Another apparatus for wireless communications at a base station is described. The apparatus may include means for transmitting, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, transmitting a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration, and transmitting a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

A non-transitory computer-readable medium storing code for wireless communications at a base station is described. The code may include instructions executable by a processor to transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration, and transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

Some examples of the method, apparatuses, and non-transitory computer-readable medium described herein may further include operations, features, means, or instructions for determining a set of beam weights for each of the set of beam ID, and mapping the set of beam weights to the set of angle coverage ranges for the set of operating frequencies, where the configuration indicates the mapping of the set of beam weights to the set of angle coverage ranges for the set of operating frequencies.

Some examples of the method, apparatuses, and non-transitory computer-readable medium described herein may further include operations, features, means, or instructions for receiving an indication of the set of operating frequencies supported by the UE, and determining the mapping between the set of beam IDs and the set of angle coverage ranges for each beam ID of the set of beam IDs based on the indication.

Some examples of the method, apparatuses, and non-transitory computer-readable medium described herein may further include operations, features, means, or instructions for determining each angle coverage range of the set of angle coverage ranges based on a global coordinate system, a local coordinate system, a configured coordinate system, or any combination thereof.

Some examples of the method, apparatuses, and non-transitory computer-readable medium described herein may further include operations, features, means, or instructions for determining each angle coverage range of the set of angle coverage ranges relative to a boresight of an antenna array of the base station or relative to a boresight of an antenna array of the UE.

Some examples of the method, apparatuses, and non-transitory computer-readable medium described herein may further include operations, features, means, or instructions for determining the set of angle coverage ranges for each beam ID of the set of beam IDs based on respective beamwidths for each beam ID.

Some examples of the method, apparatuses, and non-transitory computer-readable medium described herein may further include operations, features, means, or instructions for determining a set of logical mappings associated with a set of indices and a set of physical mappings associated with the set of angle coverage ranges, where the configuration indicates the set of logical mappings and the set of physical mappings.

In some examples of the method, apparatuses, and non-transitory computer-readable medium described herein, the set of logical mappings corresponds to a first subset of the set of operating frequencies, and the set of physical mappings corresponds to a second subset of the set of operating frequencies.

In some examples of the method, apparatuses, and non-transitory computer-readable medium described herein, transmitting the configuration may include operations, features, means, or instructions for transmitting an indication of the configuration in a SIB, a MIB, an RRC message, a layer 1 signal, a layer 2 signal, a capability information message, or any combination thereof.

In some examples of the method, apparatuses, and non-transitory computer-readable medium described herein, transmitting the configuration may include operations, features, means, or instructions for transmitting the configuration as part of a start-up or initial acquisition procedure for the UE.

In some examples of the method, apparatuses, and non-transitory computer-readable medium described herein, each of the set of beam IDs corresponds to an SSB, a CSI-RS, an SRS, or any combination thereof.

In some examples of the method, apparatuses, and non-transitory computer-readable medium described herein, the at least one frequency band corresponds to a contiguous or non-contiguous set of frequency bands in a millimeter wave frequency range.

DETAILED DESCRIPTION

Figure 1:
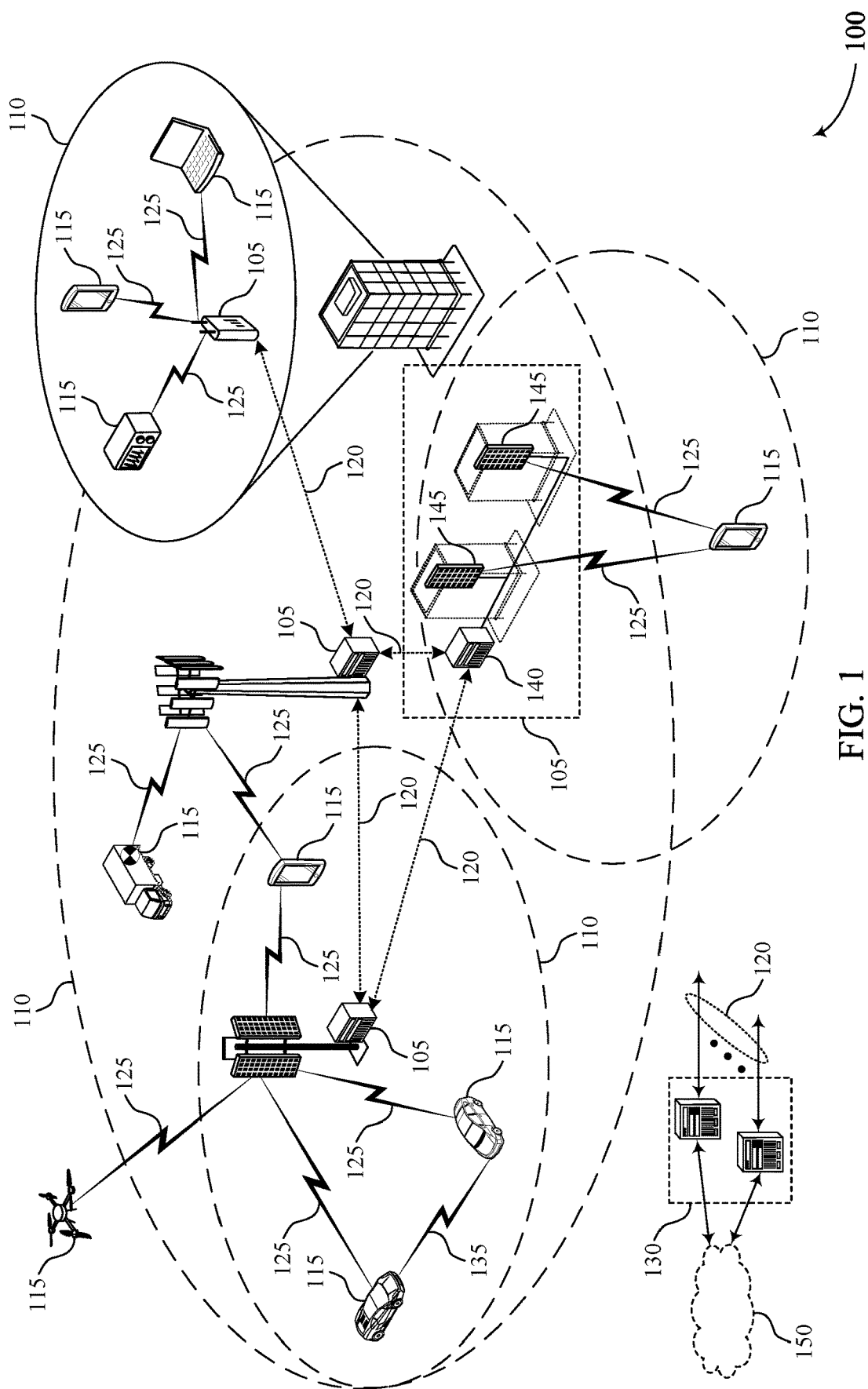
FIGS. 1 through 3 illustrate examples of a wireless communications system that supports beam correlation across frequency bands in accordance with aspects of the present disclosure.

Some wireless communications systems may employ beam management techniques to support beamformed transmissions. In some examples, beam management techniques are performed by transmitting synchronization signal blocks (SSBs), channel state information reference signals (CSI-RSs) or sounding reference signals (SRSs) to a user equipment (UE). For example, a base station may transmit a sequence of SSB beams in different directions to a UE, where each beam is associated with a beam identifier (ID). The UE may detect one or more of the SSB beams and select an SSB beam to use for communication with the base station based on a received signal strength associated with each of the SSB beams. Additionally, the UE may transmit a random access message to the base station using resources within a physical random access channel (PRACH) that are mapped to the selected SSB ID and the base station may determine the SSB ID (e.g., selected SSB beam) based on the resources within the PRACH (e.g., based on the time or frequency resources within the PRACH). The base station and the UE may utilize the selected beam to transmit or receive subsequent communications.

In some examples, a wireless communications system may support communication within an upper millimeter wave (mmW) band (e.g., frequency span above 52.6 Gigahertz (GHz)) over an ultrawide bandwidth range (e.g., a 14 GHz coverage between 57 and 71 GHz). In some examples, a UE may utilize a single radio frequency (RF) chain over the ultrawide bandwidth range in the ultrawide band. A single RF chain may include a single set of phase shifters which may constrain analog or RF beamforming with a limited ability to tune the beam weights for transmissions/receptions over the ultrawide band. As such, the UE may select a beam ID and use the beam associated with the beam ID for all communications with the base station, even in the event of a frequency switch at the UE or base station. However, operating in the ultrawide bandwidth range (e.g., at the upper mmW band) may result in performance (e.g., array gain performance relative to intended direction of a beam which corresponds to a channel cluster's physical orientation relative to the antenna array) variation between different frequencies (e.g., which may be referred to as beam squinting). For example, a beam used for SSB, CSI-RS, or SRS at one frequency may drift in angle or beamspace in another frequency. As a result, utilizing a single beam ID in the event of a frequency switch may not provide for the strongest beam (e.g., highest signal strength) for communications between the UE and the base station.

In some examples, a wireless communications system may support SSB mapping across different frequencies in ultrawide bandwidth beamforming. For example, a base station may determine a mapping which indicates SSB indices as a function of frequency and transmit the mapping to a UE. For example, the mapping may indicate that $SSB_5$ at 71 GHz maps to $SSB_4$ at 57 GHz. In the event of a frequency switch, the UE may utilize this mapping to select a new beam ID. For example, if the UE switches from operating according to a frequency of 71 GHz to a frequency of 57 GHz, the UE may select $SSB_4$ for subsequent communications with the base station. The UE may also transmit an indication of the chosen SSB beam ID to the base station. However, when the number of SSB beams is high, the UE may receive mapping of each SSB ID to multiple SSB IDs at multiple frequencies which may increase signaling overhead.

Some wireless communications systems may support a method for determining correlated beams across frequencies in ultrawide bandwidth beamforming. For example, a base station may transmit a message to the UE indicating a mapping of beam IDs to angle range coverages for a set of frequencies ranges which include operating frequencies for the UE. For example, the mapping may include a first beam ID mapped to a first angle coverage range at 57-61 GHz and a second angle coverage range at 61-66 GHz and a second beam ID mapped to a third angle coverage range at 57-61 GHz and a fourth angle coverage range at 61-66 GHz. In some examples, the UE may use this mapping to determine a new beam ID in the event of a frequency switch. For example, the UE may switch from utilizing a 57 GHz carrier frequency to utilizing a 64 GHz carrier frequency. The mapping may indicate that the second beam ID at 61-66 GHz may be capable of a similar angle range coverage (e.g., overlapping angle range coverage) to the first beam ID at 57-61 GHz and as such, the UE may select the second beam ID to use for subsequent communications. A similar angle coverage range may indicate a similar antenna array gain. The base station may also determine a set of beam weights from the mapping. That is, the UE may utilize the mapping to select a beam ID in the event of a frequency carrier switch which may account for beam squinting without excess overhead signaling.

In some examples, the wireless communications system may also support a mixture of logical mapping (e.g., mapping of SSB indices) and physical mapping (e.g., beam ID to angle mapping). For example, logical mapping may be used for a broader range of frequencies (e.g., 57 GHz-71 GHz) and physical mapping may be used for smaller or more specified ranges of frequencies. That is, physical mapping may be used to refine logical mapping.

Aspects of the disclosure are initially described in the context of wireless communications systems. Additional aspects are described in the context of antenna array gain graphs and process flows. Aspects of the disclosure are further illustrated by and described with reference to apparatus diagrams, system diagrams, and flowcharts that relate to beam correlation across frequency bands.

FIG. 1 illustrates an example of a wireless communications system 100 that supports beam correlation across frequency bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different form factors or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may utilize a physical mapping between beam IDs and beam angle coverage ranges to select a beam ID in the event of a frequency switch. For example, the UE 115 may transmit an indication of a set of operating frequencies to the base station 105. In response, the base station 105 may determine a mapping which indicates an association between beam IDs and angle coverage ranges for a set of frequency ranges which include the set of indicated operating frequencies. The base station 105 may transmit the mapping to the UE 115 and in the event of a frequency switch, the UE 115 may select a beam ID for subsequent communication with the base station 105 based on the mapping.

Figure 2:
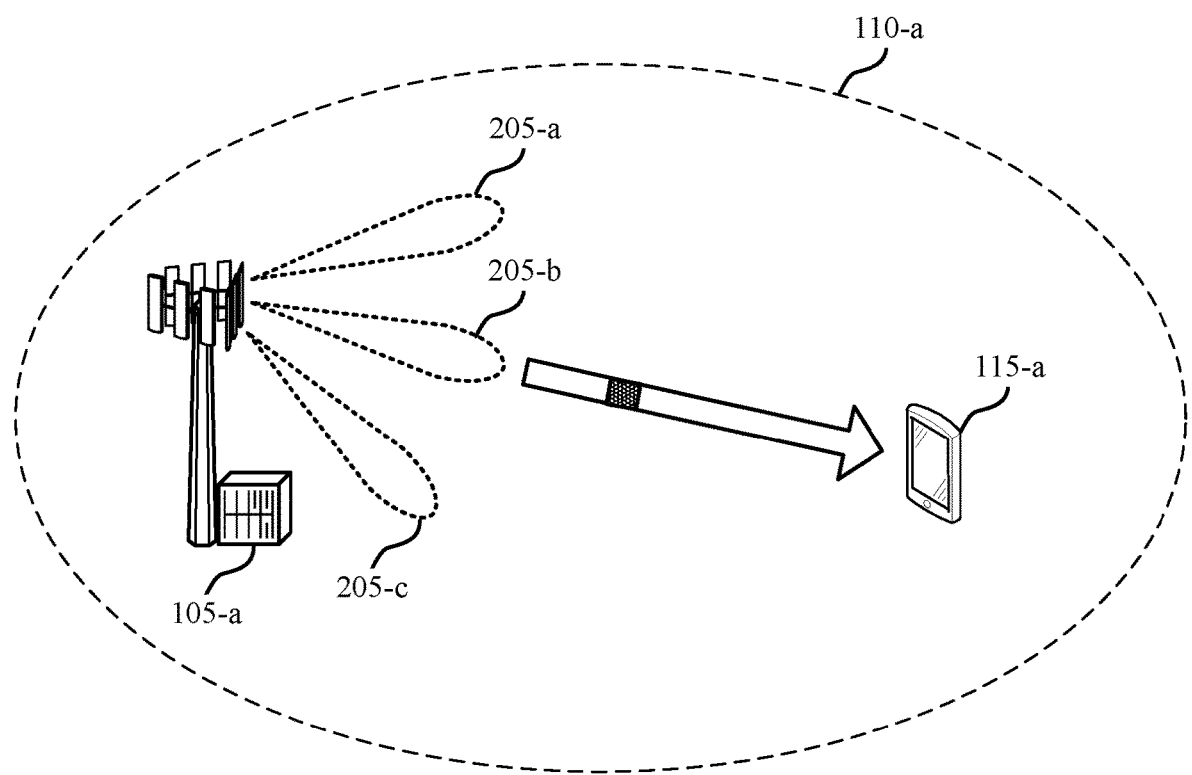

FIG. 2 illustrates an example of a wireless communications system 200 that supports beam correlation across frequency bands in accordance with aspects of the present disclosure. In some examples, wireless communications system 200 may implement aspects of wireless communications system 100. For example, wireless communications system 200 may include base station 105-*a* and UE 115-*a*, which may be examples of a base station 105 and a UE 115 as described with reference to FIG. 1. In some examples, UE 115-*a* and base station 105-*a* may be located in coverage area 110-*a*.

In some examples, wireless communications system 200 may support beam management techniques. For example, UE 115-*a* may establish a connection with base station 105-*a*. In order to communicate with base station 105-*a*, UE 115-*a* may determine a directional beam and indicate the directional beam to base station 105-*a*, such that base station 105-*a* may acquire knowledge of which directional beam to transmit downlink transmissions to UE 115-*a*. For example, base station 105-*a* may transmit a sequence of beams 205 (beam 205-*a*, beam 205-*b*, and beam 205-*c*) in different directions to UE 115-*a* via an SSB. UE 115-*a* may detect beams 205 and select a beam 205 from the sequence of beams 205 for communication with base station 105-*a*. In some examples, UE 115-*a* may select the beam 205 based on signal strength. That is, UE 115-*a* may select the beam 205 associated with the highest signal strength. UE 115-*a* may transmit an indication of selected beam 205 to base station 105-*a* via physical channel resources (e.g., physical random access channel (PRACH)). Each beam 205 may be associated with a beam ID and base station 105-*a* may determine the selected beam 205 based on the location (e.g., frequency and time) of the physical channel resource which is mapped to the beam ID. UE 115-*a* and base station 105-*a* may utilize the selected beam 205 for subsequent communications. Base station and UE 115-*a* may also utilize other types of reference signals to perform beam management techniques such as SRSs or CSI-RSs.

In some examples, UE 115-*a* and base station 105-*a* may operate within an upper mmW band (e.g., 52.6 Gigahertz (GHz) and beyond) and may utilize an ultrawide bandwidth (e.g., 14 GHz from 57-71 GHz). The wavelength at upper mmW bands may be smaller than the wavelength at other frequencies (e.g., 28 GHz or 39 GHz) and as such, more antenna elements may be packed in the same physical aperture in the upper mmW bands when compared with other frequencies resulting in large antenna arrays. In addition, the ultrawide bandwidth may be available across multiple geographies (e.g., 57-71) which may allow for increased performance and beamforming gains. In some examples, UE 115-*a* may utilize a single RF chain over the ultrawide bandwidth at the upper mmW band. The single RF chain may employ a single set of phase shifters which may constrain analog or radio frequency beamforming. That is, UE 115-*a* may select and utilize a single beam ID for all communications with base station 105-*a*, even in the event of a frequency switch. For example, UE 115-*a* may operate at a first frequency (e.g., 71 GHz) and utilize a first set of beam weights corresponding to beam 205 (e.g., $SSB_1$) for communications with base station 105-*a*. After some time, UE 115-*a* may switch to a second operating frequency (e.g., 57 GHz) and utilize the same first set of beam weights corresponding to beam 205 (e.g., $SSB_1$) for communications with base station 105-*a*. However, in some cases, analog/radio frequency codebook's array gain may change with frequency (e.g., beam squinting) especially in the direction of interest targeted by beam 205. That is, beam 205 used in either an SSB, a CSI-RS, or an SRS at one frequency may drift in angle or beamspace at a different frequency. Using a set of beam weights associated with the same beam ID across different frequencies may lead UE 115-*a* and base station 105-*a* to utilize the beam 205 with a lower signal strength (or antenna array gain) at some carrier frequency when compared with a different carrier frequency resulting in poor performance and in some cases, failure in the reception or transmission of signals as coverage is considered over the ultrawide band.

In some examples, wireless communications system 200 may support beam mapping across different frequencies. For example, UE 115-*a* may receive a mapping which may include an association between operating frequencies and beam IDs (e.g., SSB ID, CSR-RS ID, or SRS ID) from base station 105-*a*. The mapping may, additionally or alternatively, indicate an offset between a first beam ID conveyed using a first operating frequency relative to a second beam ID conveyed using a second operating frequency. For example, the mapping may indicate that $SSB_0$ at 71 GHz maps to $SSB_1$ at 57 GHz. In some examples, UE 115-*a* may utilize this mapping in the event of a frequency switch. For example, if the operating frequency switches from 57 GHz to 71 GHz, UE 115-*a* may identify a beam associated with $SSB_1$ as opposed to a beam associated with $SSB_0$ for communication with base station 105-*a* in order to account for the effects of frequency switching. UE 115-*a* may also report the mapping (e.g., selected beam ID) to base station 105-*a* (e.g., $SSB_1$). However, such techniques may be inefficient in situations where there are a large number of beams (e.g., beam IDs) and a large number of frequencies of interest because UE 115-*a* may map beam IDs as a function of frequency and an increased number of beams and frequencies may increase signaling overhead. This is particularly the case as antenna arrays become larger and carrier frequencies of interest become higher as narrower beamwidths of each beam lead to a large number of beams of interest for guaranteeing coverage over the same physical area. In addition, in some situations, UE 115-*a* may map a beam ID at a first frequency to two or more other beams IDs at different frequencies. That is, in different situations, one mapped beam ID may be more beneficial when compared to another mapped beam ID. For example, UE 115-*a* may determine that $SSB_5$ at 71 GHz maps to $SSB_4$ at 57 GHz as well as $SSB_5$ at 57 GHz because, in different situations, $SSB_4$ at 57 GHz may be more beneficial when compared to $SSB_5$ at 57 GHz and vice versa. This is the case with an SSB beam that has a broader physical angle coverage than a narrower beamwidth beam. Mapping and reporting multiple beam IDs for each beam ID may increase signaling overhead in terms of feedback.

In some examples, wireless communications system 200 may support the determination of correlated beams across frequencies. For example, UE 115-*a* may determine a set of operating frequencies that are supported by UE 115-*a* and transmit an indication of the set of operating frequencies to base station 105-*a*. In response, base station 105-*a* may determine a mapping (e.g., mapping 210) between a set of beams (e.g., beam IDs) and angle coverage ranges associated with each beam ID at the different operating frequencies indicated by UE 115-*a*. In addition, base station 105-*a* may also determine a set of beam weights associated with each beam ID. In some examples, base station 105-*a* may determine the angle coverage ranges using offline beam characterization. UE 115-*a* may receive the mapping 210 from base station 105-*a* via the system information block (SIB), master information block (MIB), radio resource control (RRC) signaling, layer 1 signaling, layer 2 signaling, a capability information message, etc. as part of a start-up or initial acquisition procedure. As described above, mapping 210 may include an association between beam IDs and angle coverage ranges for a set of operating frequencies. For example, mapping 210 may indicate that a first beam ID may support a first angle coverage range at a first operating frequency and a second angle coverage range at a second operating frequency. In addition, mapping 210 may indicate that a second beam ID may support a third angle range coverage at the first operating frequency and a fourth angle range coverage at the second operating frequency.

Mapping 210 may, additionally or alternatively, indicate a set of beam weights associated with each beam ID. In some examples, UE 115-*a* may initially operate at the first frequency and select the first beam ID for communication with base station 105-*a*. In the event of a frequency switch, UE 115-*a* may utilize mapping 210 to select a beam ID for subsequent communication with base station 105-*a*. For example, UE 115-*a* may switch to the second frequency and select the second beam ID based on mapping 210. UE 115-*a* may select the second beam ID because the angle range coverage associated with the second beam ID (indicated in mapping 210) at the second frequency (e.g., fourth angle coverage) may indicate that the beam associated with the second beam ID may have an antenna array gain or direction similar to the first beam at the first frequency. In some examples, UE 115-*a* may identify beam weights associated with the second beam ID based on mapping 210. In addition, UE 115-*a* may perform beam search or beam refinement measurements based on the second beam ID. That is, UE 115-*a* may maintain a similar directional beam in the event of a frequency switch without excess signaling overhead.

In some examples, UE 115-*a* and base station 105-*a* may use a combination of physical mapping (e.g., relationship between beam ID and angle coverage range) and logical mapping (e.g., mapping beam IDs as a function of frequency). For example, for near bore-sight angles (e.g., angles near the perpendicular plane or line of the antenna array) the UE 115-*a* may utilize logical mappings and for end-fire angles or when UE 115-*a* is located at the edge of coverage are 110-*a*, the UE may utilize physical mapping. Additionally, UE 115-*a* may utilize logical mapping to select broad beams and refine the selected broad beam utilizing physical mapping (e.g., selecting narrow beams associated with the broad beam).

Figure 3:
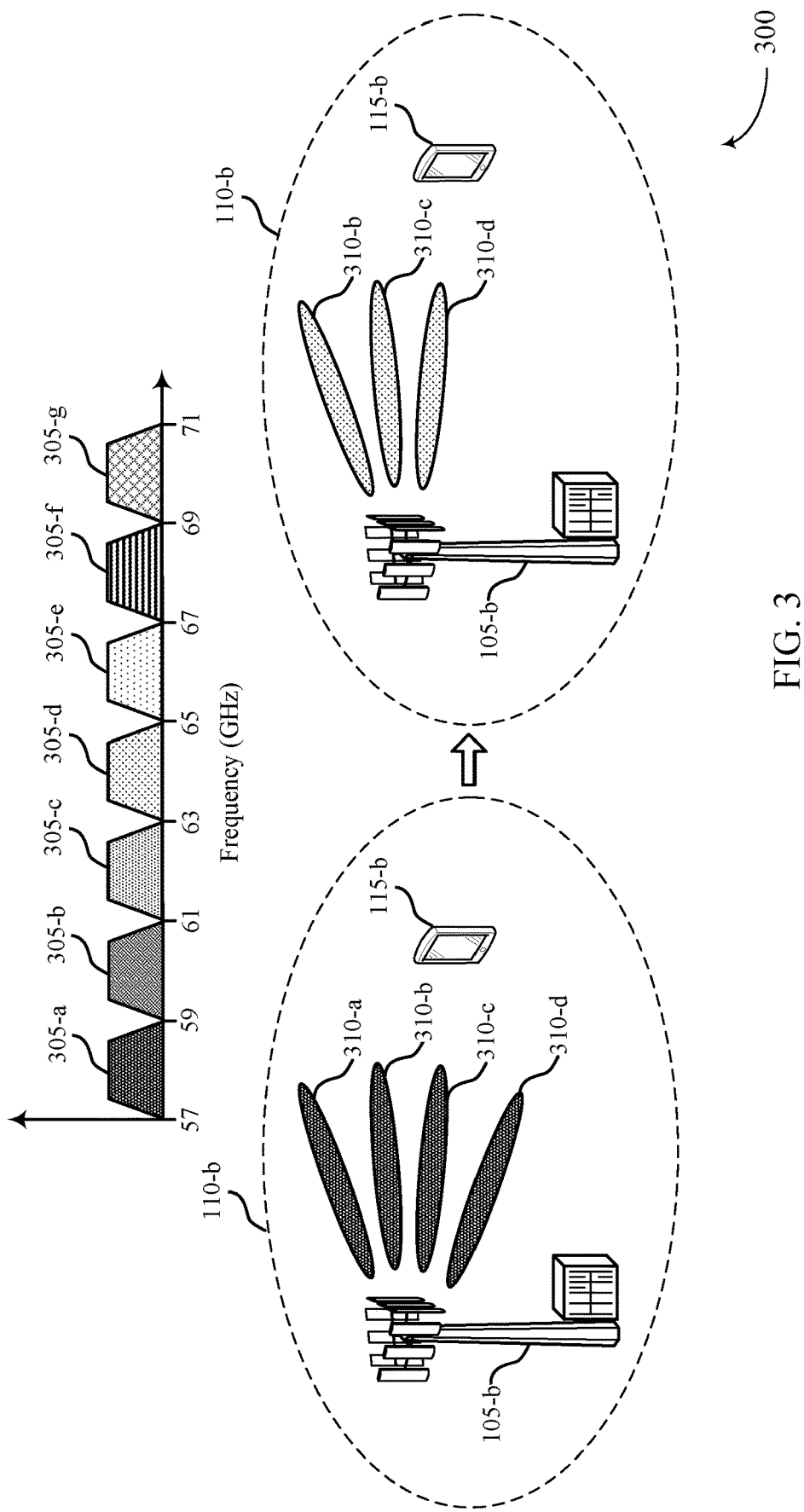

FIG. 3 illustrates an example of a wireless communications system 300 that supports beam correlation across frequency bands in accordance with aspects of the present disclosure. In some examples, wireless communications system 300 may implement aspects of wireless communications system 100 and wireless communications system 200. For example, wireless communications system 200 may include base station 105-*b* and UE 115-*b*, which may be examples of a base station 105 and a UE 115 as described with reference to FIGS. 1 and 2. In some examples, UE 115-*b* and base station 105-*b* may be located in coverage area 110-*b*.

In some examples, wireless communications system 300 may support an upper mmW band (e.g., 52.6 GHz to 71 GHz) and may utilize an ultrawide bandwidth (e.g., 14 GHz). That is, a base station 105 and a UE 115 may be capable of operating in multiple channels 305 over the ultrawide bandwidth in the upper mmW band. In some examples, UE 115-b may hop between channels 305 across the ultrawide bandwidth (e.g., 57 GHz to 71 GHz). For example, UE 115-b may operate according to frequencies within channels 305-a, 305-b, 305-c, 305-d, 305-e, and 305-g where each channel 305 spans 2 GHz.

In some examples, UE 115-b may establish a connection with base station 105-b and operate according to a first frequency. For example, UE 115-b may operate according to a frequency associated with channel 305-a (e.g., 57 GHz). In some examples, UE 115-b may determine a directional beam to utilize for communication with base station 105-b. In such examples, base station 105-b may transmit a sequence of beams 310 to UE 115-b in different directions according to the first frequency and UE 115-b may select a beam from the sequence of beams which maximizes signal strength (e.g., RSRP). For example, base station 105-b may transmit beam 310-a, beam 310-b, beam 310-c, and beam 310-d. Beams 310 may be examples of SSB beams, CSI-RS beams, or SRS beams and each beam may have an associated beam ID. For example, beam 310-a, beam 310-b, beam 310-c, and beam 310-d may be associated with $SSB_0$, $SSB_1$, $SSB_2$, and $SSB_3$ respectively. In some examples, UE 115-b may determine that the beam 310-c and associated beam ID $SSB_2$ allows for the highest signal strength and may transmit an indication of the beam ID to base station 105-b.

In some examples, UE 115-b may undergo a frequency switch. In such cases, UE 115-b may utilize a mapping determined by base station 105-b, or otherwise configured at the UE 115-b, to determine a beam ID in the event of a frequency switch. For example, UE 115-b may indicate a set of operating frequencies within a frequency band in the upper mmW band (e.g., 57 GHz, 64 GHz, or 71 GHz) to base station 105-b. Additionally, UE 115-b may also indicate operating frequencies within one or more other frequency bands within the upper mmW band (e.g., contiguous or non-contiguous frequency bands). In response, base station 105-b may determine a mapping between a set of beam IDs and a set of angle coverages for a set of frequency ranges which include the set of operating frequencies indicated by UE 115-b. In some examples, the set of frequency ranges may be configured at UE 115-b or base station 105-b. Additionally, the angle coverage ranges may be relative to the boresight of the antenna array at base station 105-b or UE 115-b. An example of the mapping may be seen in Table 1 below.

TABLE 1

| Beam ID | 57-61 GHz | 61-66 GHz | 66-71 GHz |
|---|---|---|---|
| $SSB_0$ | 21° to 47° | 20° to 44° | 18°-38° |
| $SSB_1$ | 0° to 26° | 0° to 23° | 0° to 20° |
| $SSB_2$ | −20° to 0° | −19° to 0° | −18° to 0° |
| $SSB_3$ | −45° to −15° | −41° to −12° | −37° to −10° |

In Table 1, base station 105-b may determine $SSB_0$, $SSB_1$, $SSB_2$, and $SSB_3$ and an associated angle coverage range for each SSB beam ID which corresponds to three frequency ranges (e.g., 57-61 GHz, 61-66 GHz, and 66-71 GHz), where the three frequency ranges include the operating frequencies indicated by UE 115-b. In some examples, base station 105-b may indicate the mapping to UE 115-b. The full mapping may (e.g., Table 1) be indicated to UE 115-b. Alternatively, a portion of the mapping (e.g., portion of Table 1) may be indicated to UE 115-b. In some examples, the mapping may be signaled dynamically via control signaling. That is, different portions of the mapping may be sent to UE 115-b at different times or the mapping may be updated over time as conditions (e.g., channel conditions) change.

In some examples, UE 115-b may switch from a first operating frequency to a second operating frequency. For example, UE 115-b may switch from operating at 57 GHz to operating at 64 GHz. That is, UE 115-b may hop from channel 305-a to channel 305-d. If the frequency switch occurs at base station 105-b, base station 105-b may transmit an indication of the frequency switch to UE 115-b. In some examples, UE 115-b may utilize the mapping (e.g., Table 1) received from base station 105-b to select a second beam for communication with base station 105-b at the second operating frequency (e.g., 64 GHz). As described above, the UE 115-b may utilize a first beam ID (e.g., $SSB_2$ or beam 310-c) at the first operating frequency (e.g., 57 GHz). In some examples, UE 115-b may select the second beam ID from the mapping based on the angle range associated with the first beam ID at the first operating frequency. For example, UE 115-b may select a beam ID associated with an angle coverage range at the second operating frequency that at least partially overlaps the angle coverage range associated with first beam ID at the first operating frequency. For example, $SSB_2$ at a frequency range of 57-61 GHz is capable of covering a −20° to 0° range, as such, UE 115-b may select either $SSB_2$ at 64 GHz or $SSB_3$ at 64 GHz. As described with reference to FIG. 2, depending on the situation (e.g., depending on the angle at which the dominant cluster in the channel is seen over $SSB_2$ at 57 GHz), $SSB_2$ at 64 GHz or $SSB_3$ at 64 GHz may be more beneficial (e.g., offer a similar array gain to $SSB_2$ at 57 GHz). That is, UE 115-b may utilize beam 310-d or beam 310-c at 64 GHz for communication with base station 105-b. Base station 105-b may also determine the beam based on the mapping for transmitting downlink signal to UE 115-b.

Figure 4A:
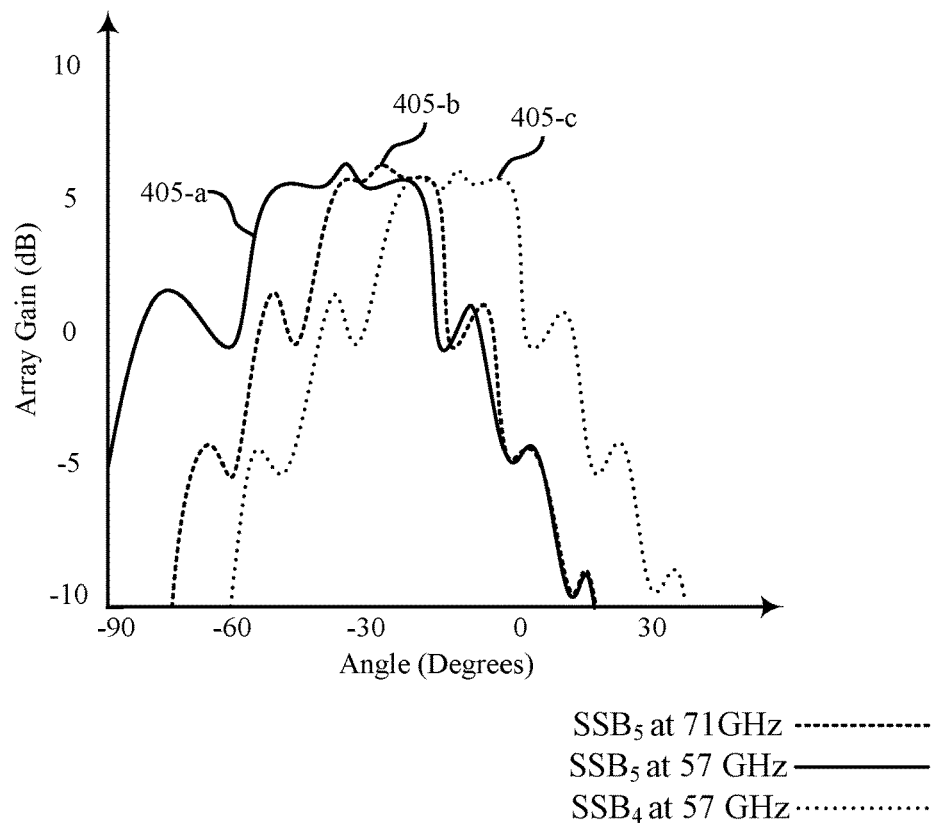
FIGS. 4A and 4B illustrate examples of an antenna array gain graph that supports beam correlation across frequency bands in accordance with aspects of the present disclosure.
Figure 4B:
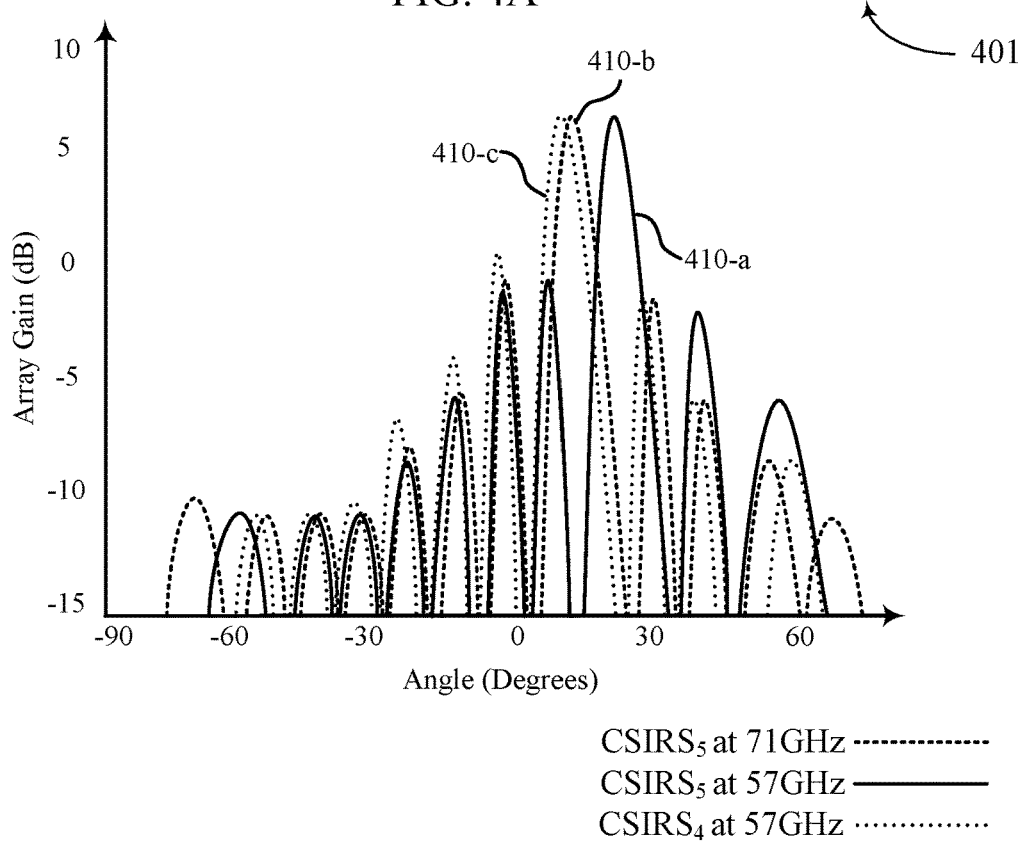

FIGS. 4A and 4B illustrates examples of antenna array gain plots 401 and 402 that supports beam correlation across frequency bands in accordance with aspects of the present disclosure. In some examples, antenna array gain plots 401 and 402 may implement aspects of wireless communications systems 100, 200, or 300. As described with reference to FIGS. 2 and 3, a base station may determine a mapping which indicates a relationship between beam IDs and area coverage ranges for a set of frequency ranges which include operating frequencies supported by a UE and transmit the mapping to the UE. The UE may use the mapping in the event of a frequency switch to select a directional beam for subsequent communications with the base station.

FIG. 4A shows the array gain of different SSB beams associated with different SSB IDs as a function of frequency. In some examples, the UE may select a first beam to communicate with base station at a first frequency (e.g., 71 GHz). For example, the UE may select SSB beam 405-b which may have an associated beam ID $SSB_5$. In some examples, the UE may undergo a frequency switch, such that the UE switches from an operating frequency of 71 GHz to 57 GHz. In such an example, the UE 115 may select an SSB beam 405 that covers a similar angle range (e.g., overlapping frequency range) or a current angle range of the UE when compared to SSB beam 405-b using the mapping. For example, UE may select SSB beam 405-a or SSB beam 405-c at 57 GHz. As shown FIG. 4A, SSB beam 405-a may deviate slightly in array gain when compared to SSB beam 405-b, whereas SSB beam 405-c may deviate greatly in array gain when compared to 405-b. As such, the UE may select SSB beam 405-a for subsequent communication with the base station at 57 GHz.

FIG. 4B shows the array gain of different CSI-RS beams associated with different CSI-RS IDs as a function of frequency. In some examples, the UE may select a first beam to communicate with the base station at a first frequency (e.g., 71 GHz). For example, the UE may select CSI-RS beam 410-*b* which may have an associated beam ID CSI-RS$_5$. In some examples, the UE may undergo a frequency switch, such that the UE switches from an operating frequency of 71 GHz to 57 GHz. In such an example, the UE may select CSI-RS beam 410 that covers a similar angle range (e.g., overlapping frequency range) or a current angle range of the UE when compared to CSI-RS beam 410-*b* using the mapping. For example, UE may select CSI-RS beam 410-*a* or CSI-RS beam 410-*c* at 57 GHz. As shown FIG. 4B, CSI-RS beam 410-*a* may deviate slightly in array gain when compared to CSI-RS beam 410-*b*, whereas CSI-RS beam 410-*c* may deviate greatly in array gain when compared to CSI-RS beam 410-*b*. As such, the UE may select CSI-RS beam 410-*a* for subsequent communication with the base station at 57 GHz.

In some examples, the UE and the base station may utilize a combination of logical mapping (e.g., beam IDs as a function of frequency) and physical mapping (e.g., relationship between beam IDs and angle range coverages) for beam selection. For example, the UE may utilize logical mapping for broad beams (e.g., SSB beams 405) and utilize physical mapping to refine the broad beams (e.g., CSI-RS beams 410 or SSB beams 405). That is, the UE may select an SSB beam 405 using the logical mapping and select a narrow beam (e.g., CSI-RS beam 410 or SSB beam 405) from a subset of narrow beams (e.g., CSI-RS beams 410) beams that correspond to the selected SSB beam (e.g., frequency range of the SSB) using the physical mapping.

Figure 5:
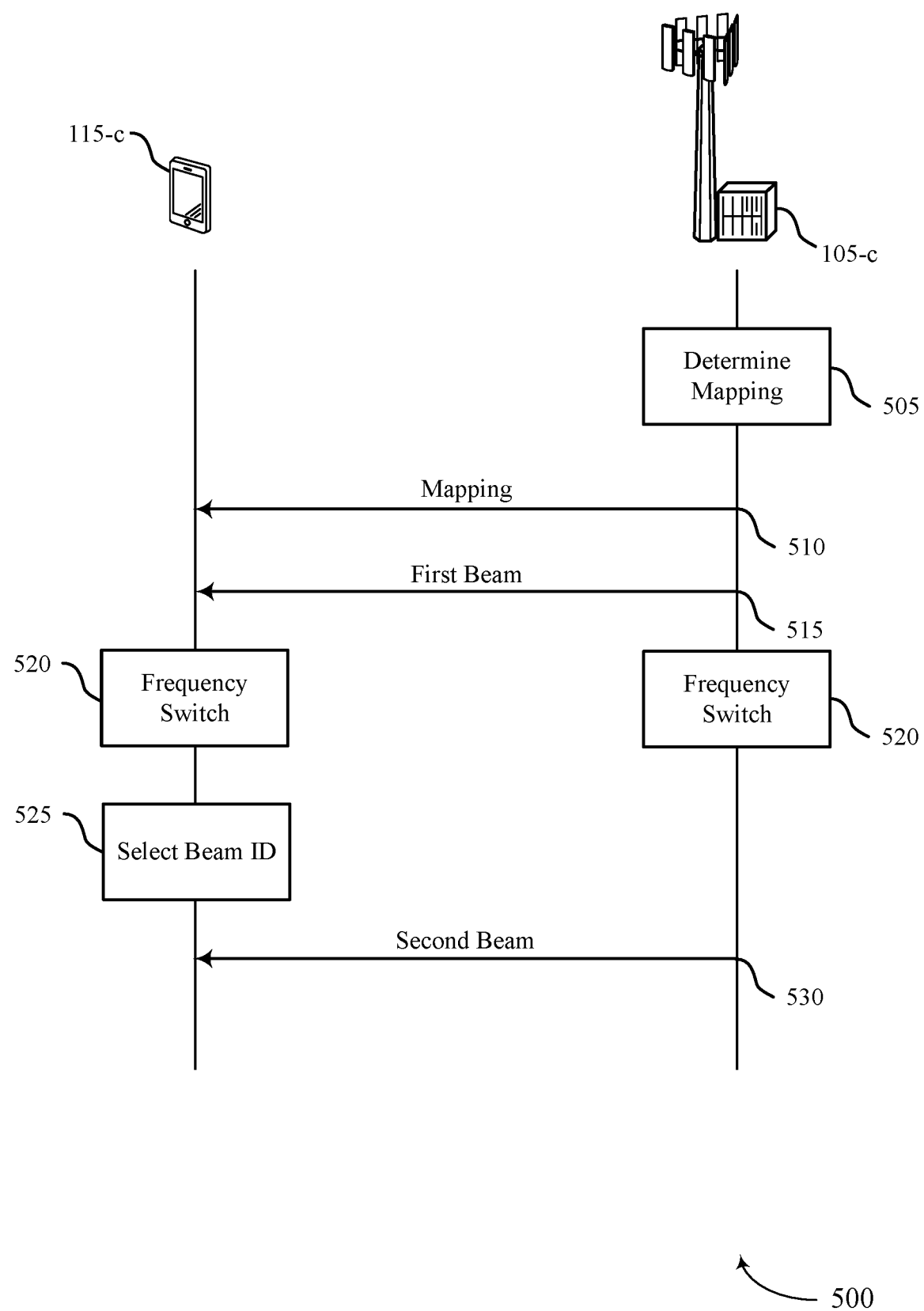
FIG. 5 illustrates an example of a process flow that supports beam correlation across frequency bands in accordance with aspects of the present disclosure.

FIG. 5 illustrates an example of a process flow 500 that supports beam correlation across frequency bands in accordance with aspects of the present disclosure. In some examples, process flow 500 may implement aspects of wireless communications system 200, wireless communications system 300, wireless communications system 300, antenna array gain 401, and antenna array gain 402. For example, process flow 500 may include UE 115-*c* and base station 105-*c* which may be examples of a base station 105 and a UE 115 as described with reference to FIGS. 1 through 4. In some examples, UE 115-*c* may select a directional beam based on a mapping indicating an association between a set of beam IDs and a set of angle range coverages for multiple operating frequencies in the event of a frequency switch. UE 115-*c* and base station 105-*c* may implement one or more techniques described herein. Alternative examples of the following may be implemented, where steps are performed in a different order than described or not performed at all. In some cases, additional features not mentioned below or further may be added.

At 505, base station 105-*c* may determine a mapping. The mapping may include an association between a set of beam IDs and a set of angle coverage ranges for two or more frequencies ranges which include the operating frequencies of UE 115-*c*. The frequency ranges may be configured by UE 115-*c* or base station 105-*c*. In some examples, the angle coverage ranges may be based on global, local, or configured coordinate system and relative to a boresight of an antenna array of base station 105-*c* or UE 115-*c*. Additionally, base station 105-*c* may determine a set of beam weights for each beam ID.

At 510, base station 105-*c* may transmit an indication of the mapping to UE 115-*c*. In some examples, base station 105-*c* may transmit an indication of the mapping dynamically via control signaling. In some examples, UE 115-*c* may receive the mapping as part of a startup or initial acquisition procedure. The mapping may be received in a SIB, MIB, RRC control message, layer 1 signal, layer 2 signal, capability message, or any combination.

At 515, base station 105-*c* may transmit a first beam which corresponds to a first beam ID at a first frequency to UE 115-*c*. In some examples, the first frequency may be located in the upper mmW band. For examples, the first frequency may be 57 GHz.

At 520, UE 115-*c* or base station 105-*c* may trigger a frequency switch. That is, UE 115-*c* and base station 105-*c* may switch from operating according to the first frequency to a second frequency. For examples, UE 115-*c* and base station 105-*c* may switch from 57 GHz to 64 GHz. If the frequency switch is triggered at base station 105-*c*, base station 105-*c* may transmit an indication of the frequency switch to UE 115-*c*.

At 525, UE 115-*c* may select a second beam ID based on the mapping. In some examples, UE 115-*c* may select the second beam ID associated with an angle coverage range that partially or fully overlaps the angle coverage range of the first beam ID at the first frequency. In some examples, two or more beam IDs may be capable of an overlapping angle coverage range when compared to the first beam ID. In such example, UE 115-*c* may select one of the two or more beam which offers a similar array gain to the first beam ID at the first frequency. In some examples, the first beam ID and the second beam ID may be the same. In some examples, base station 105-*c* may also utilize the mapping to select a beam ID. Additionally, UE 115-*c* may identify a set of beam weight associated with the second beam ID based on the mapping.

At 530, base station 105-*c* may transmit a second beam which corresponds to the second beam ID at the second frequency and UE 115-*c* may receive the second beam.

Figure 6:
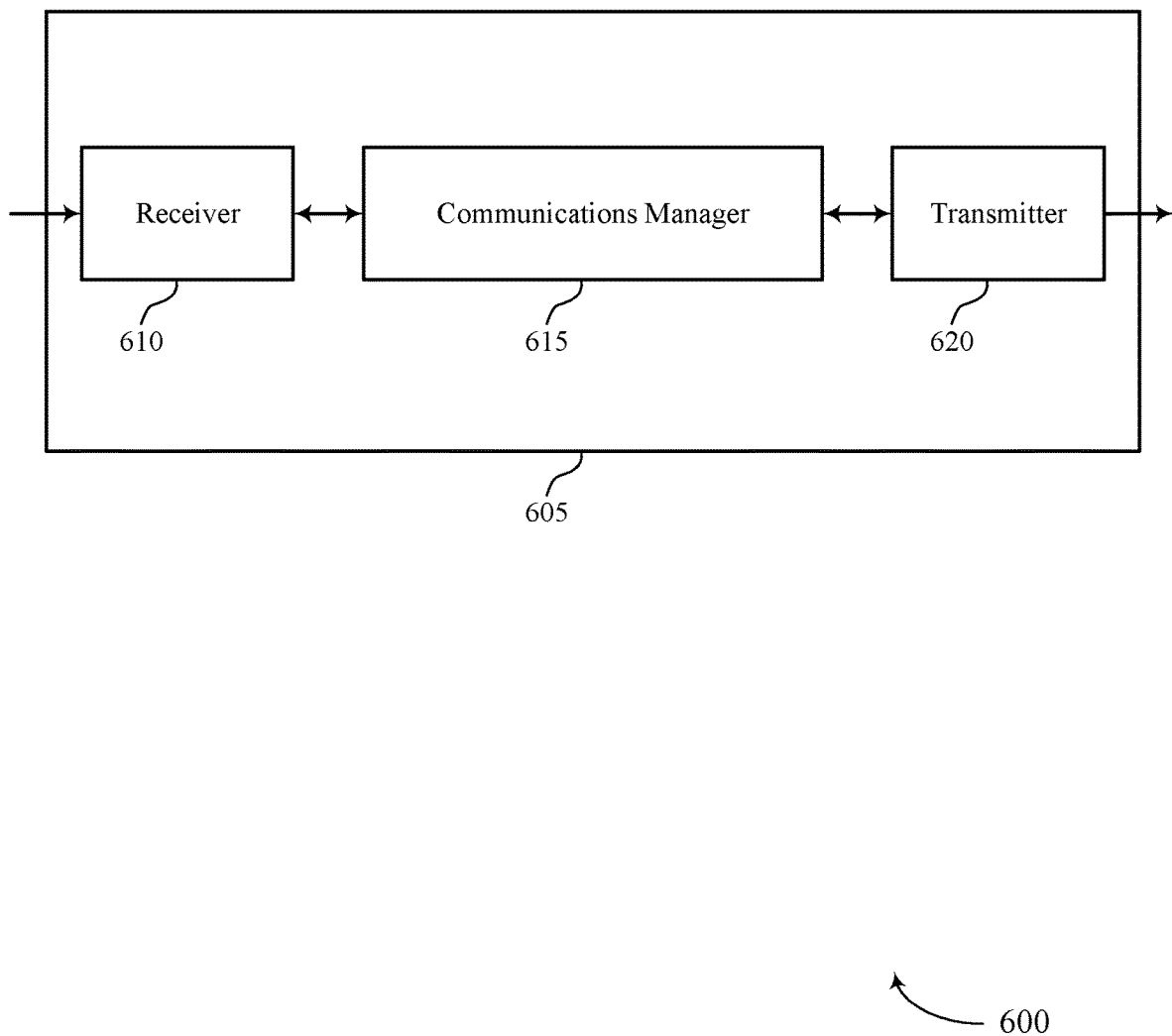
FIGS. 6 and 7 show block diagrams of devices that support beam correlation across frequency bands in accordance with aspects of the present disclosure.

FIG. 6 shows a block diagram 600 of a device 605 that supports beam correlation across frequency bands in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam correlation across frequency bands). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, determine a frequency switch from a first operating frequency of the set of operating frequencies to a second operating frequency of the set of operating frequencies, and select a second beam ID of the set of beam IDs based on the frequency switch and the mapping, the selected second beam ID corresponding to the second operating frequency and a second angle coverage range based on the mapping. The communications manager 615 may be an example of aspects of the communications manager 910 described herein.

The actions performed by the communications manager 615 as described herein may be implemented to realize one or more potential advantages. For example, utilizing a physical mapping (e.g., mapping between angle range coverages and beam IDs) may allow device 605 to reduce overhead signaling in terms of feedback. The physical mapping is available at device 605 (e.g., UE). This may allow the base station to determine a beam ID based on the mapping instead of receiving an indication of the selected beam ID from device 605. Thus, overhead signaling may be reduced.

In addition, the physical mapping may reduce processing at device 605. For example, utilizing the physical mapping or a portion of the physical mapping may incur less processing when compared to logical mapping. That is, identifying a beam ID based on a mapping between angles coverage ranges and beam IDs at a set of frequency ranges (e.g., physical mapping) at device 605 may involve less processing than identifying a beam ID based on mapping between the beam ID and multiple other beam IDs at different frequencies (e.g., logical mapping). Such techniques may reduce the number of processing cycles performed by device 605, which may reduce power consumption and increase battery life.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
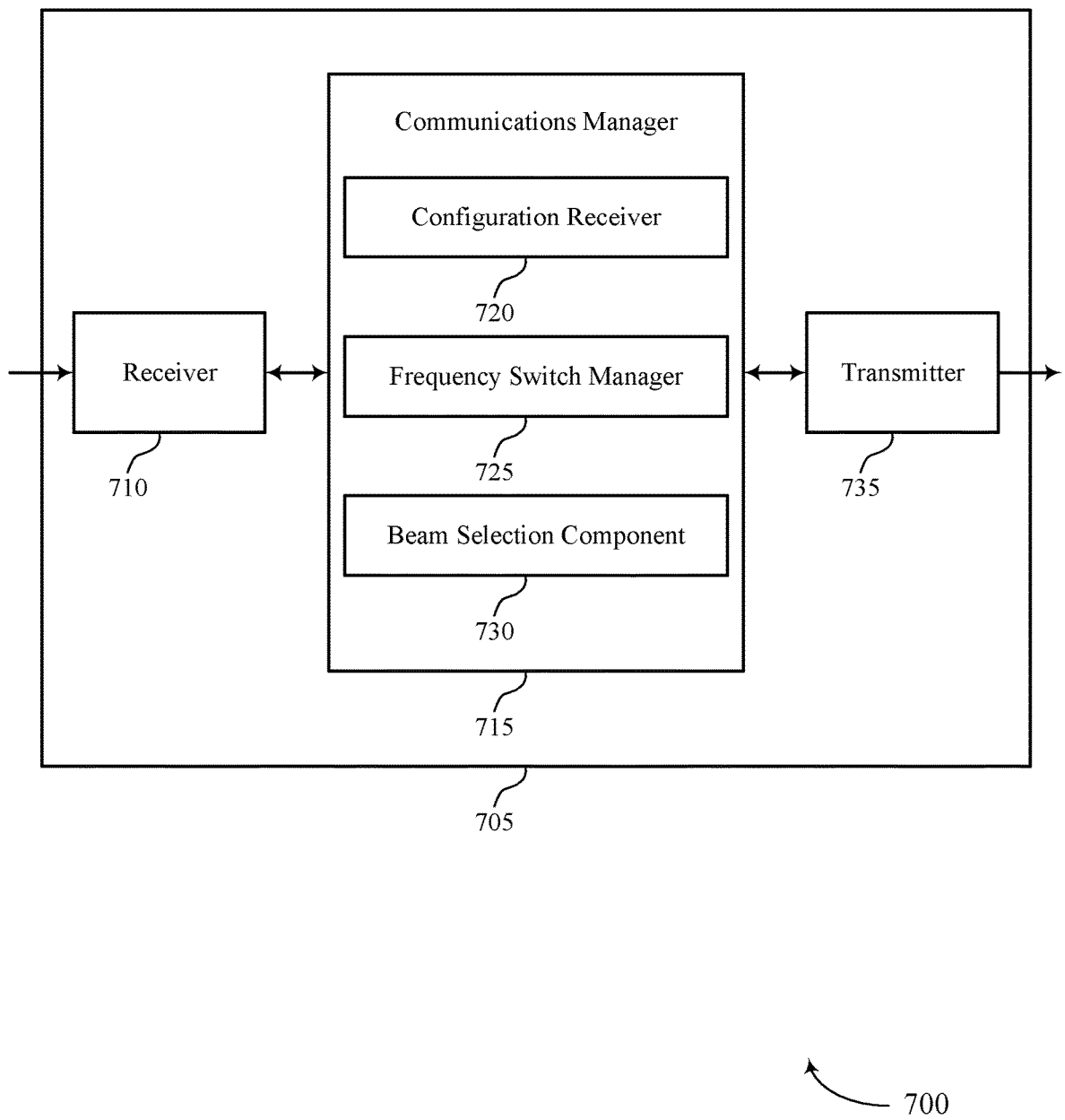

FIG. 7 shows a block diagram 700 of a device 705 that supports beam correlation across frequency bands in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to beam correlation across frequency bands). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration receiver 720, a frequency switch manager 725, and a beam selection component 730. The communications manager 715 may be an example of aspects of the communications manager 910 described herein.

The configuration receiver 720 may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band.

The frequency switch manager 725 may determine a frequency switch from a first operating frequency of the set of operating frequencies to a second operating frequency of the set of operating frequencies.

The beam selection component 730 may select a second beam ID of the set of beam IDs based on the frequency switch and the mapping, the selected second beam ID corresponding to the second operating frequency and a second angle coverage range based on the mapping.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
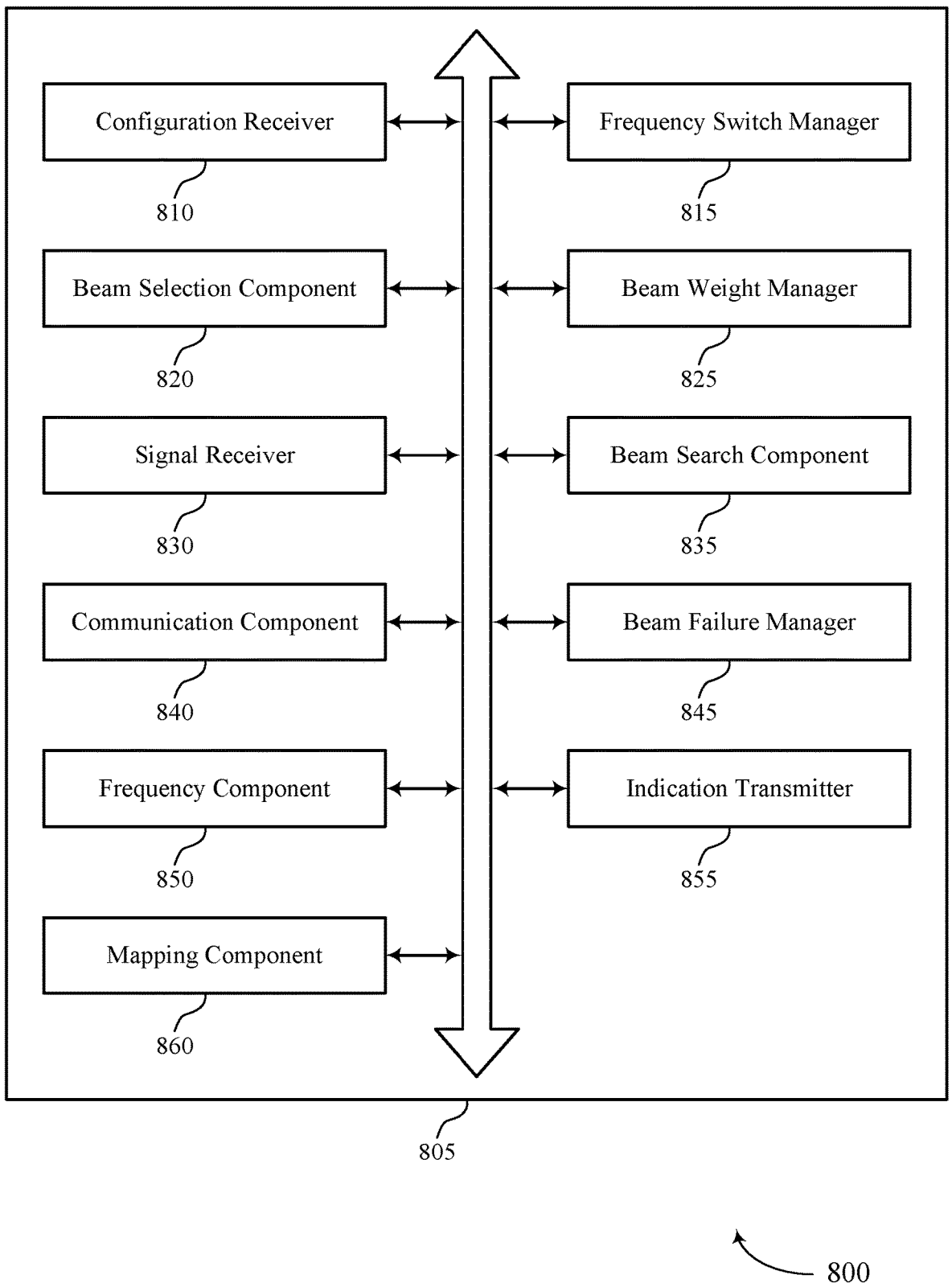
FIG. 8 shows a block diagram of a communications manager that supports beam correlation across frequency bands in accordance with aspects of the present disclosure.

FIG. 8 shows a block diagram 800 of a communications manager 805 that supports beam correlation across frequency bands in accordance with aspects of the present disclosure. The communications manager 805 may be an example of aspects of a communications manager 615, a communications manager 715, or a communications manager 910 described herein. The communications manager 805 may include a configuration receiver 810, a frequency switch manager 815, a beam selection component 820, a beam weight manager 825, a signal receiver 830, a beam search component 835, a communication component 840, a beam failure manager 845, a frequency component 850, an indication transmitter 855, and a mapping component 860. Each of these modules may communicate, directly or indirectly, with one another (e.g., via one or more buses).

The configuration receiver 810 may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band.

In some examples, the configuration receiver 810 may receive an indication of the configuration in a SIB, a MIB, an RRC message, a layer 1 signal, a layer 2 signal, a capability information message, or any combination thereof.

In some examples, the configuration receiver 810 may receive the configuration as part of a start-up or initial acquisition procedure for the UE.

In some cases, each angle coverage range of the set of angle coverage ranges is based on a global coordinate system, a local coordinate system, a configured coordinate system, or any combination thereof. In some cases, each angle coverage range of the set of angle coverage ranges is relative to a boresight of an antenna array of the base station or a boresight of an antenna array of the UE. In some cases, each of the set of beam IDs corresponds to an SSB, a CSI-RS, an SRS, or any combination thereof.

In some cases, the at least one frequency band corresponds to a contiguous or non-contiguous set of frequency bands in the mmW frequency range.

The frequency switch manager 815 may determine a frequency switch from a first operating frequency of the set of operating frequencies to a second operating frequency of the set of operating frequencies.

The beam selection component 820 may select a second beam ID of the set of beam IDs based on the frequency switch and the mapping, the selected second beam ID corresponding to the second operating frequency and a second angle coverage range based on the mapping.

The beam weight manager 825 may identify a set of beam weights for the second beam ID based on the configuration and the second operating frequency, where the set of beam weights is indicated by the configuration.

The signal receiver 830 may receive a signal from the base station based on the second beam ID and the set of beam weights.

The beam search component 835 may perform a set of beam search measurements associated with the base station based on the second beam ID.

The communication component 840 may communicate with the base station using the second beam ID based on the set of beam search measurements.

The beam failure manager 845 may preemptively perform a beam failure procedure based on the configuration and the frequency switch, where the second beam ID is selected based on the beam failure procedure.

The frequency component 850 may determine that the set of operating frequencies are supported by the UE.

The indication transmitter 855 may transmit an indication of the set of operating frequencies to the base station.

The mapping component 860 may determine a set of logical mappings associated with a set of indices for the set of beam IDs and a set of physical mappings associated with the set of angle coverage ranges based on the configuration, where the second beam ID is selected based on the set of logical mappings and the set of physical mappings.

In some cases, the set of logical mappings corresponds to a first subset of the set of operating frequencies. In some cases, the set of physical mappings corresponds to a second subset of the set of operating frequencies.

Figure 9:
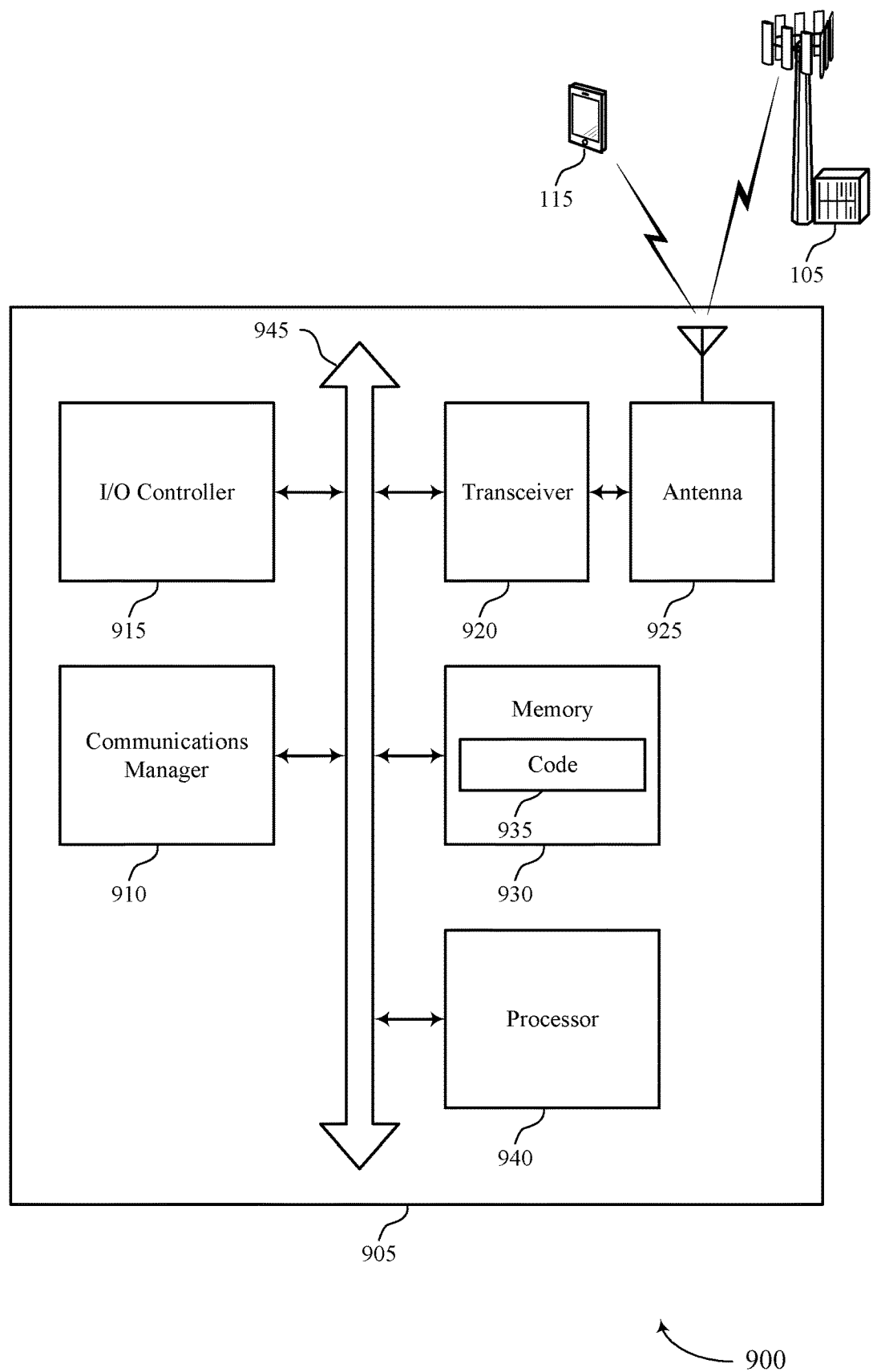
FIG. 9 shows a diagram of a system including a device that supports beam correlation across frequency bands in accordance with aspects of the present disclosure.

FIG. 9 shows a diagram of a system 900 including a device 905 that supports beam correlation across frequency bands in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, determine a frequency switch from a first operating frequency of the set of operating frequencies to a second operating frequency of the set of operating frequencies, and select a second beam ID of the set of beam IDs based on the frequency switch and the mapping, the selected second beam ID corresponding to the second operating frequency and a second angle coverage range based on the mapping.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam correlation across frequency bands).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
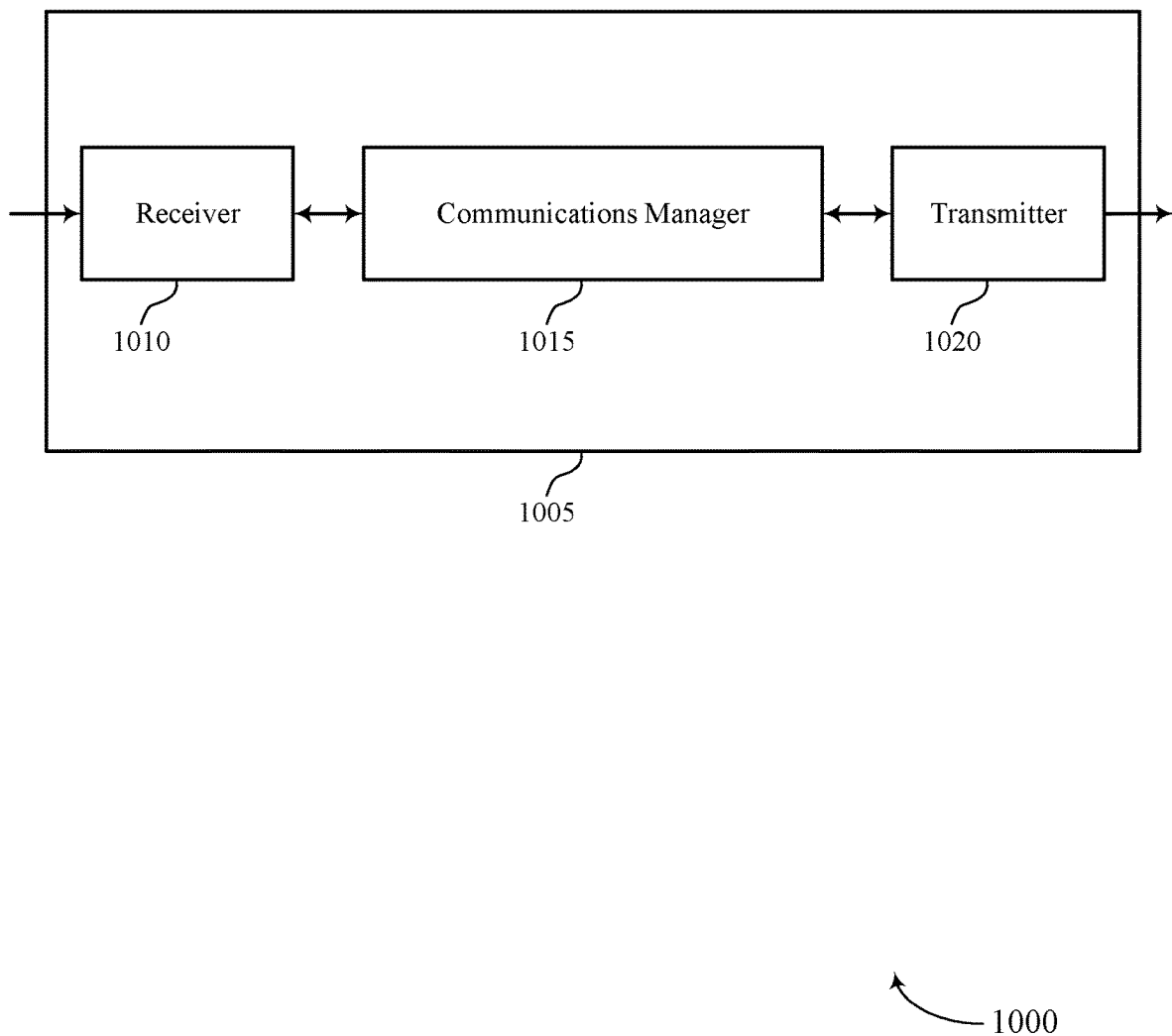
FIGS. 10 and 11 show block diagrams of devices that support beam correlation across frequency bands in accordance with aspects of the present disclosure.

FIG. 10 shows a block diagram 1000 of a device 1005 that supports beam correlation across frequency bands in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam correlation across frequency bands). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration, and transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
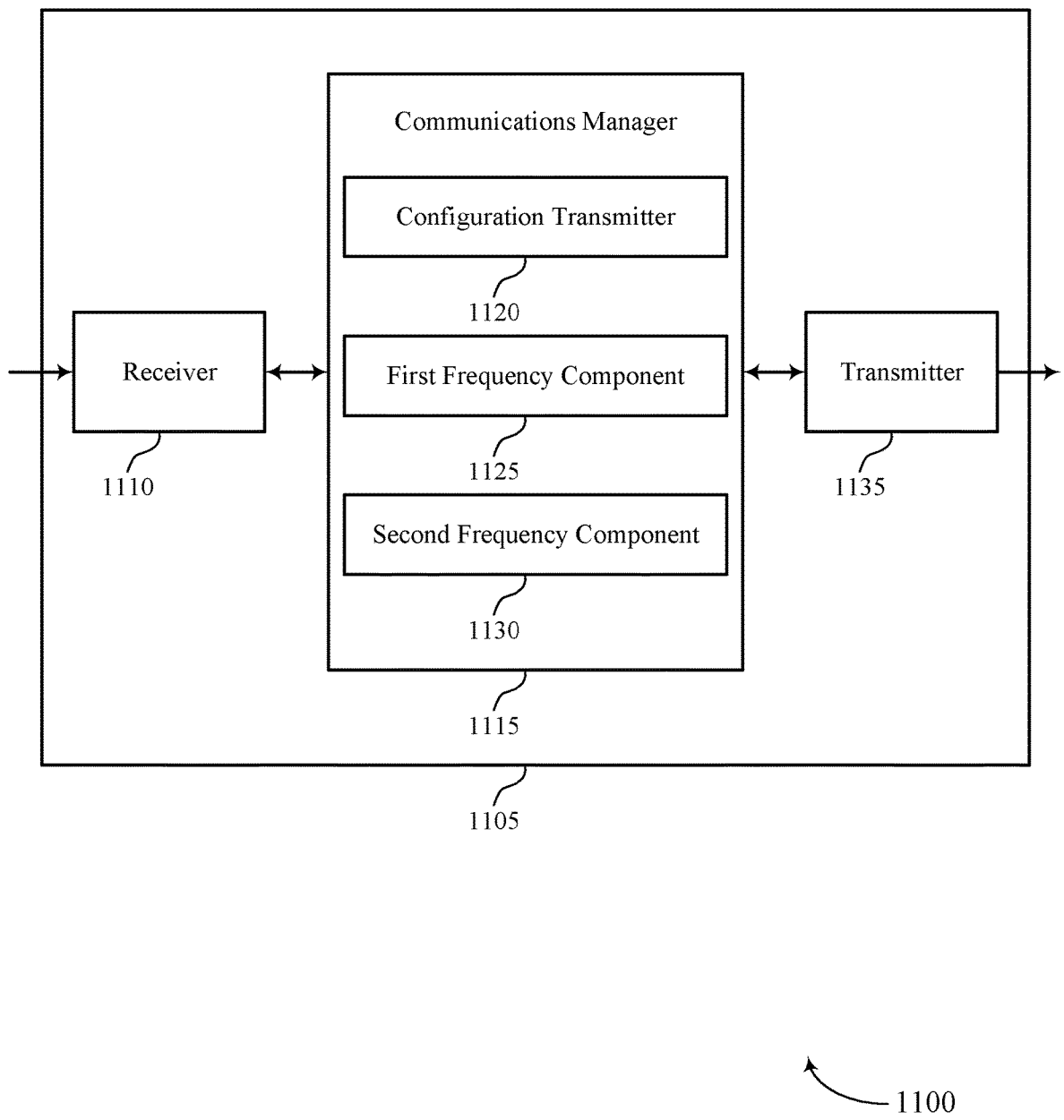

FIG. 11 shows a block diagram 1100 of a device 1105 that supports beam correlation across frequency bands in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to beam correlation across frequency bands). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration transmitter 1120, a first frequency component 1125, and a second frequency component 1130. The communications manager 1115 may be an example of aspects of the communications manager 1310 described herein.

The configuration transmitter 1120 may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band.

The first frequency component 1125 may transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration.

The second frequency component 1130 may transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
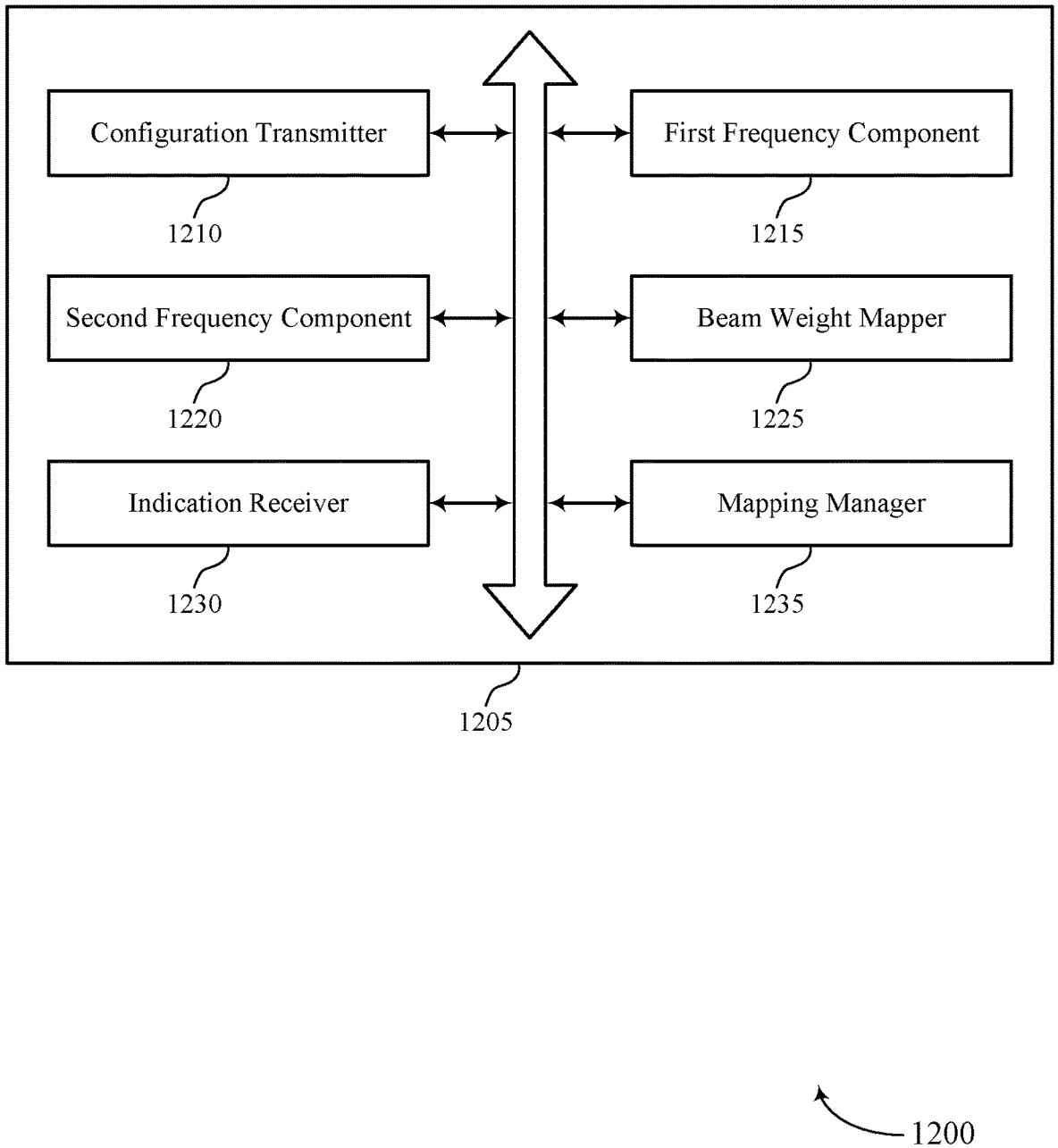
FIG. 12 shows a block diagram of a communications manager that supports beam correlation across frequency bands in accordance with aspects of the present disclosure.

FIG. 12 shows a block diagram 1200 of a communications manager 1205 that supports beam correlation across frequency bands in accordance with aspects of the present disclosure. The communications manager 1205 may be an example of aspects of a communications manager 1015, a communications manager 1115, or a communications manager 1310 described herein. The communications manager 1205 may include a configuration transmitter 1210, a first frequency component 1215, a second frequency component 1220, a beam weight mapper 1225, an indication receiver 1230, and a mapping manager 1235. Each of these modules may communicate, directly or indirectly, with one another (e.g., via one or more buses).

The configuration transmitter 1210 may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band.

In some examples, the configuration transmitter 1210 may transmit an indication of the configuration in a SIB, a MIB, an RRC message, a layer 1 signal, a layer 2 signal, a capability information message, or any combination thereof.

In some examples, the configuration transmitter 1210 may transmit the configuration as part of a start-up or initial acquisition procedure for the UE.

In some cases, each of the set of beam IDs corresponds to an SSB, a CSI-RS, an SRS, or any combination thereof.

In some cases, the at least one frequency band corresponds to a contiguous or non-contiguous set of frequency bands in the mmW frequency range.

The first frequency component 1215 may transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration.

The second frequency component 1220 may transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

The beam weight mapper 1225 may determine a set of beam weights for each of the set of beam ID.

In some examples, the beam weight mapper 1225 may map the set of beam weights to the set of angle coverage ranges for the set of operating frequencies, where the configuration indicates the mapping of the set of beam weights to the set of angle coverage ranges for the set of operating frequencies.

The indication receiver 1230 may receive an indication of the set of operating frequencies supported by the UE.

The mapping manager 1235 may determine the mapping between the set of beam IDs and the set of angle coverage ranges for each beam ID of the set of beam IDs based on the indication. In some examples, the mapping manager 1235 may determine each angle coverage range of the set of angle coverage ranges based on a global coordinate system, a local coordinate system, a configured coordinate system, or any combination thereof.

In some examples, the mapping manager 1235 may determine each angle coverage range of the set of angle coverage ranges relative to a boresight of an antenna array of the base station or relative to a boresight of an antenna array of the UE.

In some examples, the mapping manager 1235 may determine the set of angle coverage ranges for each beam ID of the set of beam IDs based on respective beamwidths for each beam ID.

In some examples, the mapping manager 1235 may determine a set of logical mappings associated with a set of indices and a set of physical mappings associated with the set of angle coverage ranges, where the configuration indicates the set of logical mappings and the set of physical mappings.

In some cases, the set of logical mappings corresponds to a first subset of the set of operating frequencies. In some cases, the set of physical mappings corresponds to a second subset of the set of operating frequencies.

Figure 13:
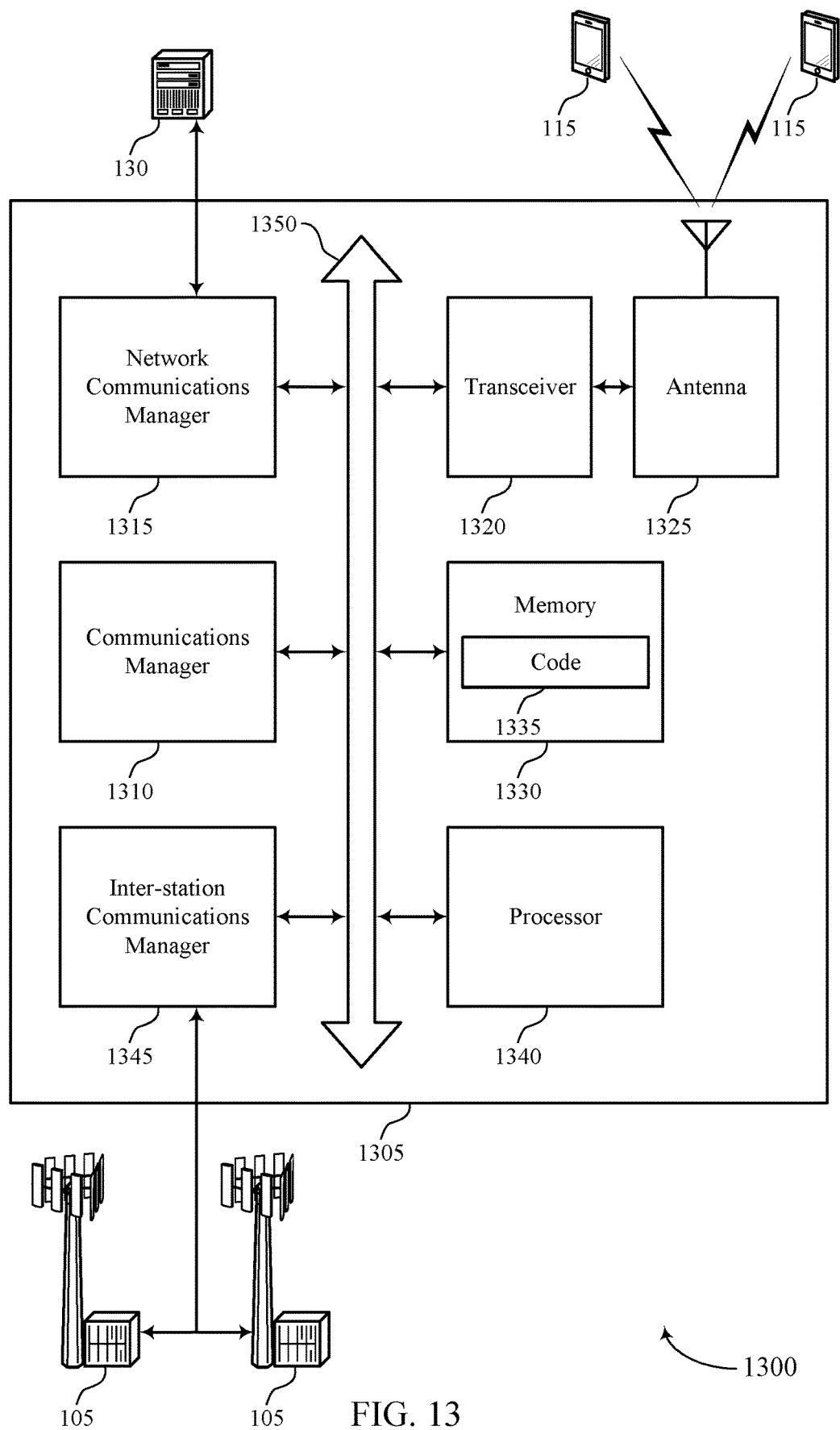
FIG. 13 shows a diagram of a system including a device that supports beam correlation across frequency bands in accordance with aspects of the present disclosure.

FIG. 13 shows a diagram of a system 1300 including a device 1305 that supports beam correlation across frequency bands in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band, transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration, and transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam correlation across frequency bands).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
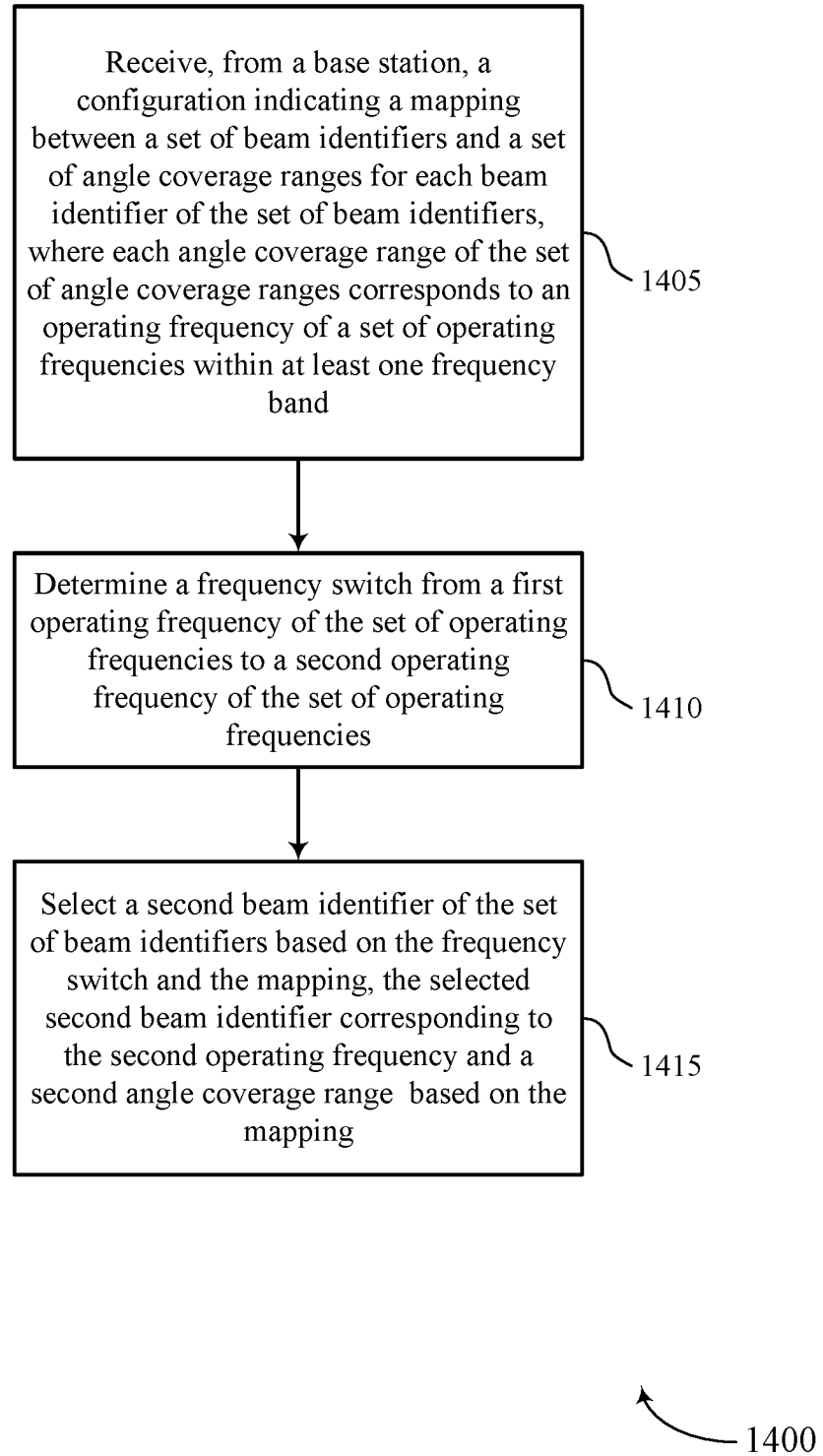
FIGS. 14 through 19 show flowcharts illustrating methods that support beam correlation across frequency bands in accordance with aspects of the present disclosure.

FIG. 14 shows a flowchart illustrating a method 1400 that supports beam correlation across frequency bands in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band. The operations of 1405 may be performed according to the methods described herein. In some examples, aspects of the operations of 1405 may be performed by a configuration receiver as described with reference to FIGS. 6 through 9.

At 1410, the UE may determine a frequency switch from a first operating frequency of the set of operating frequencies to a second operating frequency of the set of operating frequencies. The operations of 1410 may be performed according to the methods described herein. In some examples, aspects of the operations of 1410 may be performed by a frequency switch manager as described with reference to FIGS. 6 through 9.

At 1415, the UE may select a second beam ID of the set of beam IDs based on the frequency switch and the mapping, the selected second beam ID corresponding to the second operating frequency and a second angle coverage range based on the mapping. The operations of 1415 may be performed according to the methods described herein. In some examples, aspects of the operations of 1415 may be performed by a beam selection component as described with reference to FIGS. 6 through 9.

Figure 15:
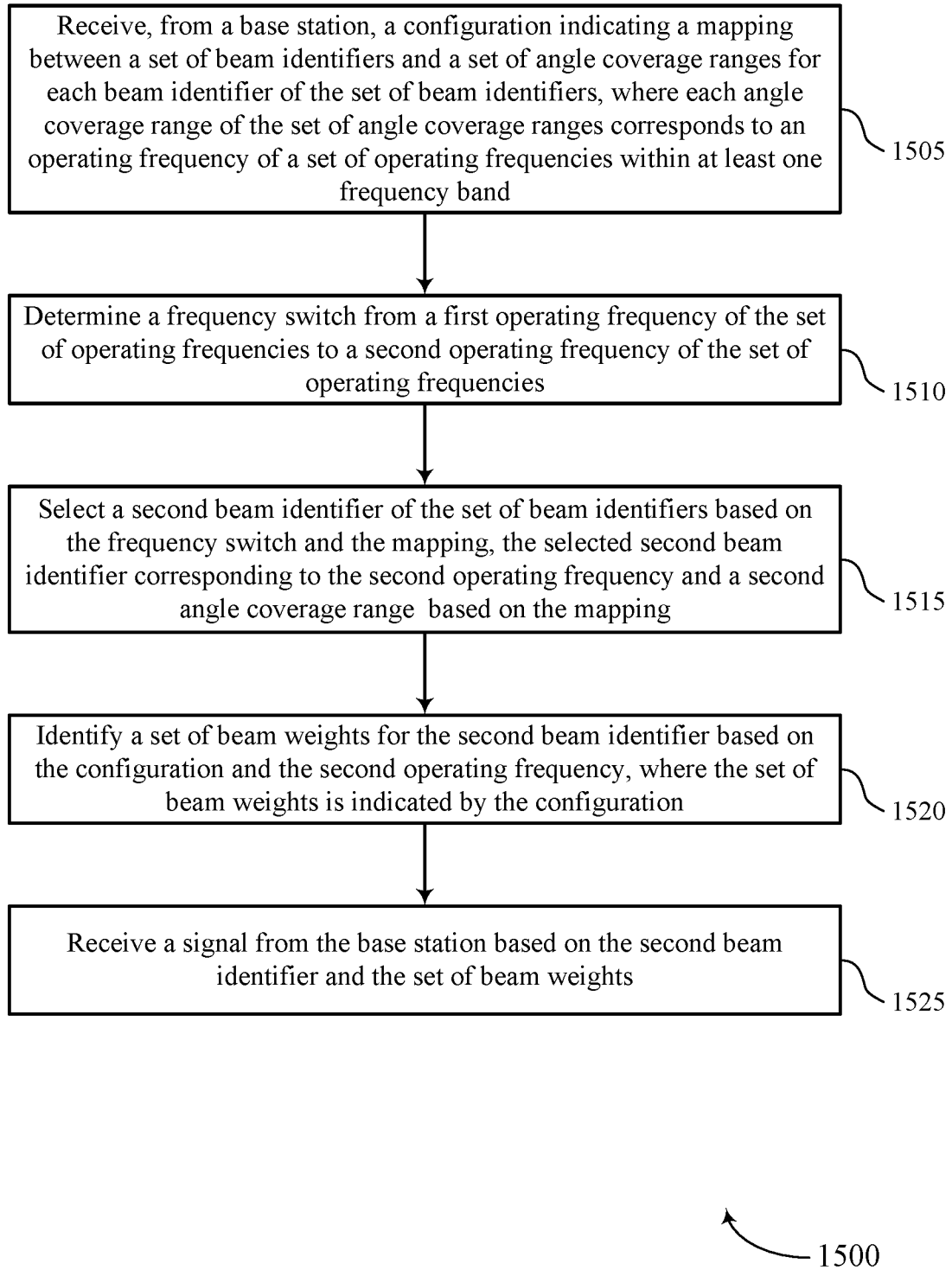

FIG. 15 shows a flowchart illustrating a method 1500 that supports beam correlation across frequency bands in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band. The operations of 1505 may be performed according to the methods described herein. In some examples, aspects of the operations of 1505 may be performed by a configuration receiver as described with reference to FIGS. 6 through 9.

At 1510, the UE may determine a frequency switch from a first operating frequency of the set of operating frequencies to a second operating frequency of the set of operating frequencies. The operations of 1510 may be performed according to the methods described herein. In some examples, aspects of the operations of 1510 may be performed by a frequency switch manager as described with reference to FIGS. 6 through 9.

At 1515, the UE may select a second beam ID of the set of beam IDs based on the frequency switch and the mapping, the selected second beam ID corresponding to the second operating frequency and a second angle coverage range based on the mapping. The operations of 1515 may be performed according to the methods described herein. In some examples, aspects of the operations of 1515 may be performed by a beam selection component as described with reference to FIGS. 6 through 9.

At 1520, the UE may identify a set of beam weights for the second beam ID based on the configuration and the second operating frequency, where the set of beam weights is indicated by the configuration. The operations of 1520 may be performed according to the methods described herein. In some examples, aspects of the operations of 1520 may be performed by a beam weight manager as described with reference to FIGS. 6 through 9.

At 1525, the UE may receive a signal from the base station based on the second beam ID and the set of beam weights. The operations of 1525 may be performed according to the methods described herein. In some examples, aspects of the operations of 1525 may be performed by a signal receiver as described with reference to FIGS. 6 through 9.

Figure 16:
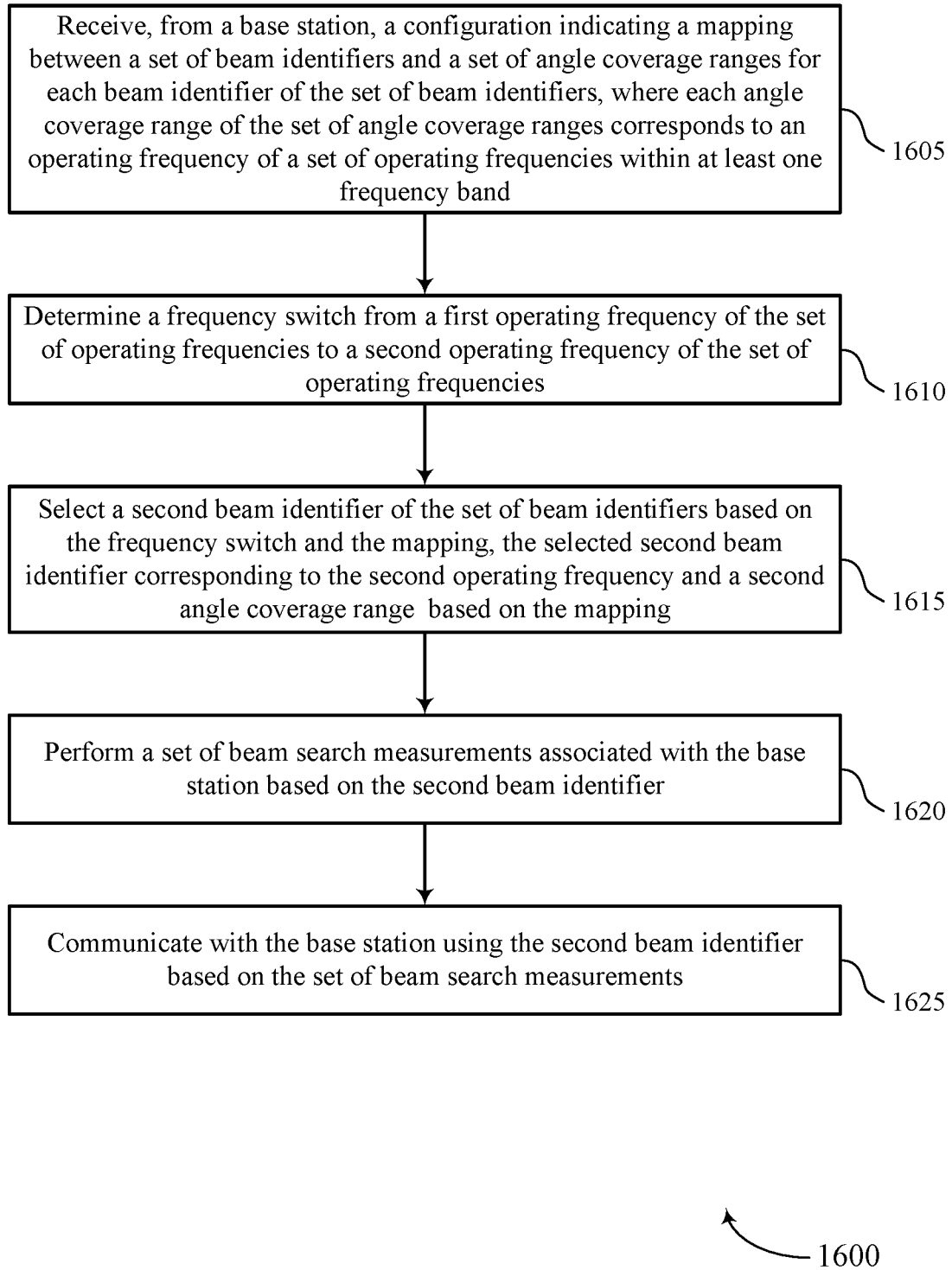

FIG. 16 shows a flowchart illustrating a method 1600 that supports beam correlation across frequency bands in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band. The operations of 1605 may be performed according to the methods described herein. In some examples, aspects of the operations of 1605 may be performed by a configuration receiver as described with reference to FIGS. 6 through 9.

At 1610, the UE may determine a frequency switch from a first operating frequency of the set of operating frequencies to a second operating frequency of the set of operating frequencies. The operations of 1610 may be performed according to the methods described herein. In some examples, aspects of the operations of 1610 may be performed by a frequency switch manager as described with reference to FIGS. 6 through 9.

At 1615, the UE may select a second beam ID of the set of beam IDs based on the frequency switch and the mapping, the selected second beam ID corresponding to the second operating frequency and a second angle coverage range based on the mapping. The operations of 1615 may be performed according to the methods described herein. In some examples, aspects of the operations of 1615 may be performed by a beam selection component as described with reference to FIGS. 6 through 9.

At 1620, the UE may perform a set of beam search measurements associated with the base station based on the second beam ID. The operations of 1620 may be performed according to the methods described herein. In some examples, aspects of the operations of 1620 may be performed by a beam search component as described with reference to FIGS. 6 through 9.

At 1625, the UE may communicate with the base station using the second beam ID based on the set of beam search measurements. The operations of 1625 may be performed according to the methods described herein. In some examples, aspects of the operations of 1625 may be performed by a communication component as described with reference to FIGS. 6 through 9.

Figure 17:
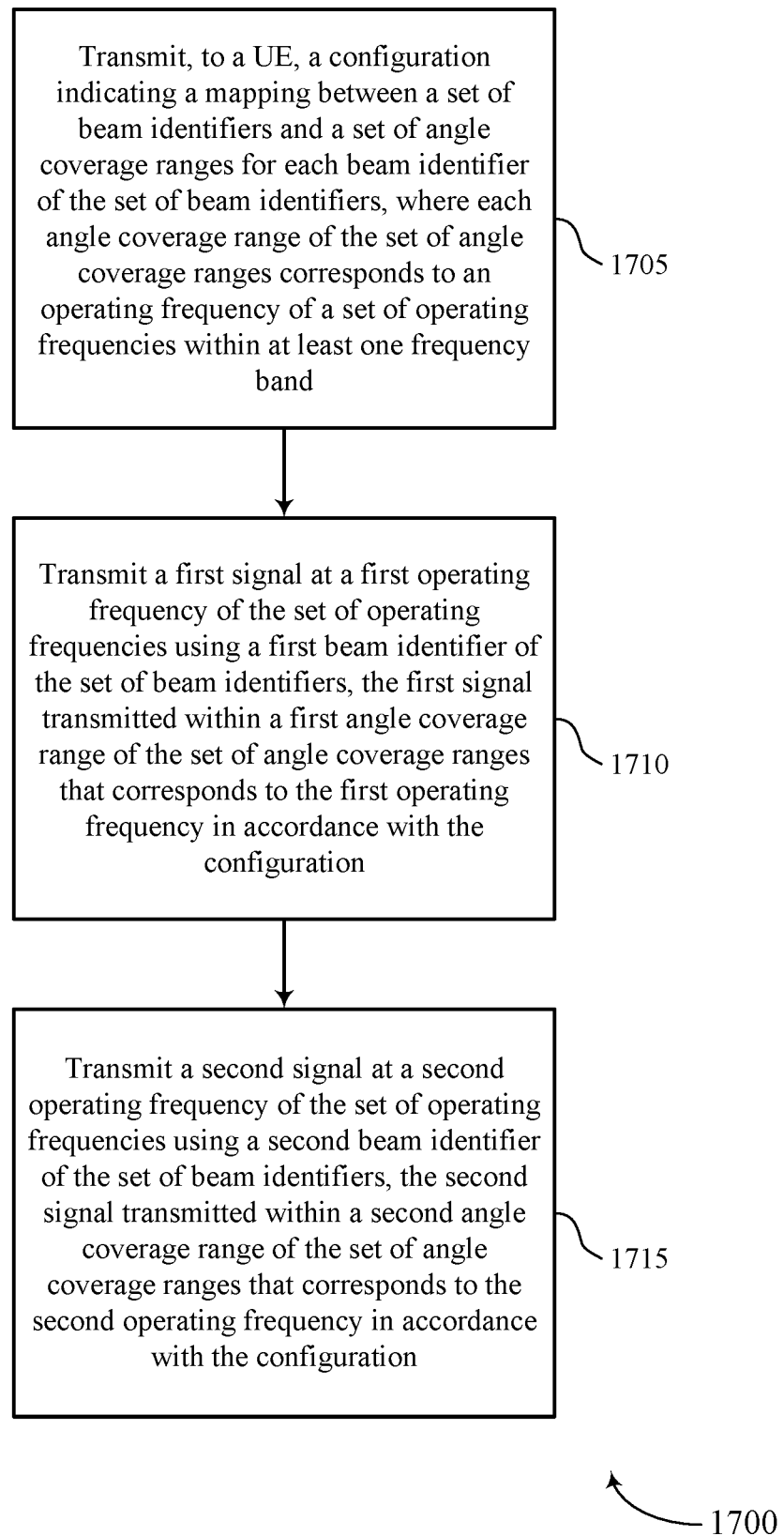

FIG. 17 shows a flowchart illustrating a method 1700 that supports beam correlation across frequency bands in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band. The operations of 1705 may be performed according to the methods described herein. In some examples, aspects of the operations of 1705 may be performed by a configuration transmitter as described with reference to FIGS. 10 through 13.

At 1710, the base station may transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration. The operations of 1710 may be performed according to the methods described herein. In some examples, aspects of the operations of 1710 may be performed by a first frequency component as described with reference to FIGS. 10 through 13.

At 1715, the base station may transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration. The operations of 1715 may be performed according to the methods described herein. In some examples, aspects of the operations of 1715 may be performed by a second frequency component as described with reference to FIGS. 10 through 13.

Figure 18:
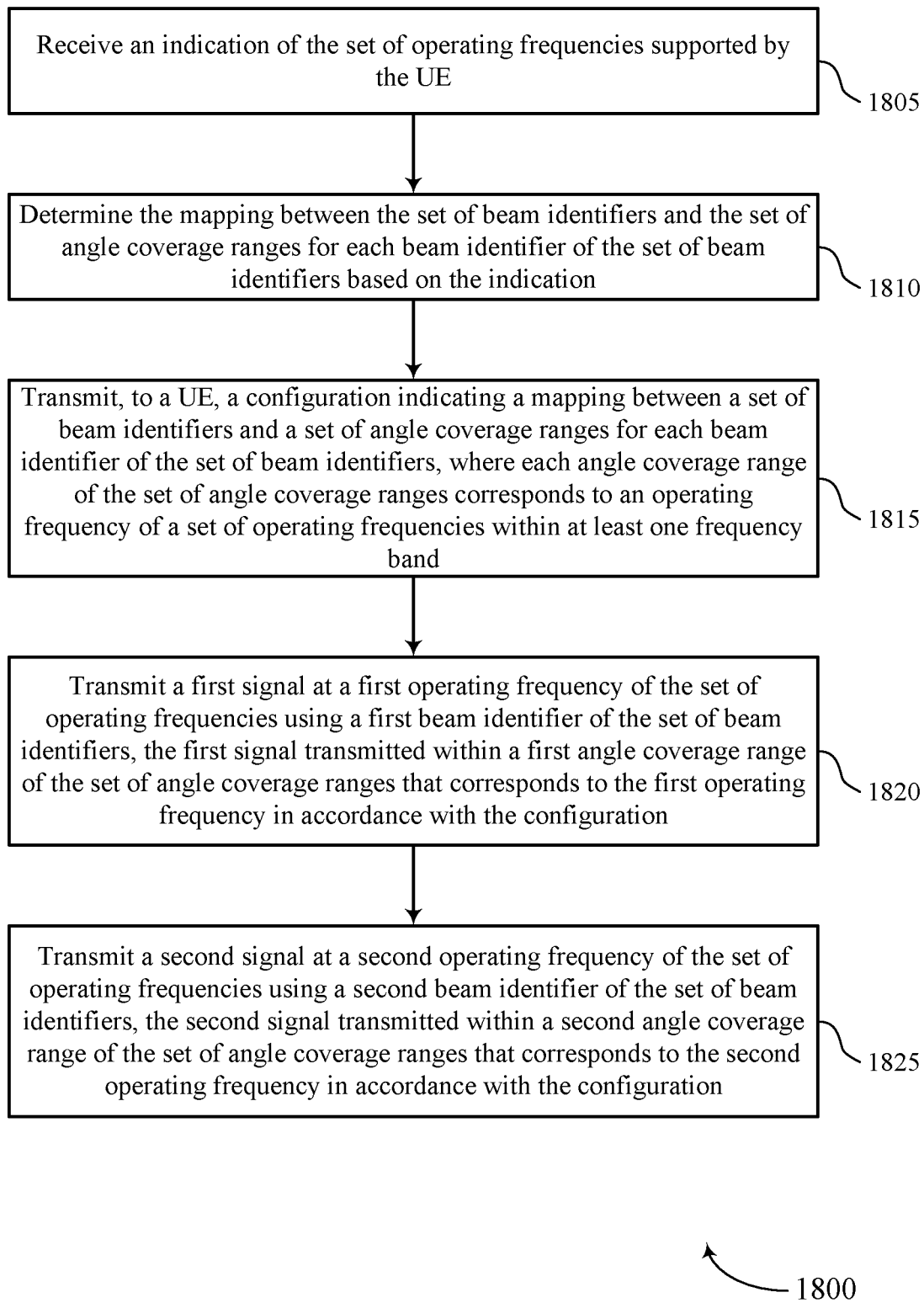

FIG. 18 shows a flowchart illustrating a method 1800 that supports beam correlation across frequency bands in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive an indication of the set of operating frequencies supported by the UE. The operations of 1805 may be performed according to the methods described herein. In some examples, aspects of the operations of 1805 may be performed by an indication receiver as described with reference to FIGS. 10 through 13.

At 1810, the base station may determine the mapping between the set of beam IDs and the set of angle coverage ranges for each beam ID of the set of beam IDs based on the indication. The operations of 1810 may be performed according to the methods described herein. In some examples, aspects of the operations of 1810 may be performed by a mapping manager as described with reference to FIGS. 10 through 13.

At 1815, the base station may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band. The operations of 1815 may be performed according to the methods described herein. In some examples, aspects of the operations of 1815 may be performed by a configuration transmitter as described with reference to FIGS. 10 through 13.

At 1820, the base station may transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration. The operations of 1820 may be performed according to the methods described herein. In some examples, aspects of the operations of 1820 may be performed by a first frequency component as described with reference to FIGS. 10 through 13.

At 1825, the base station may transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration. The operations of 1825 may be performed according to the methods described herein. In some examples, aspects of the operations of 1825 may be performed by a second frequency component as described with reference to FIGS. 10 through 13.

Figure 19:
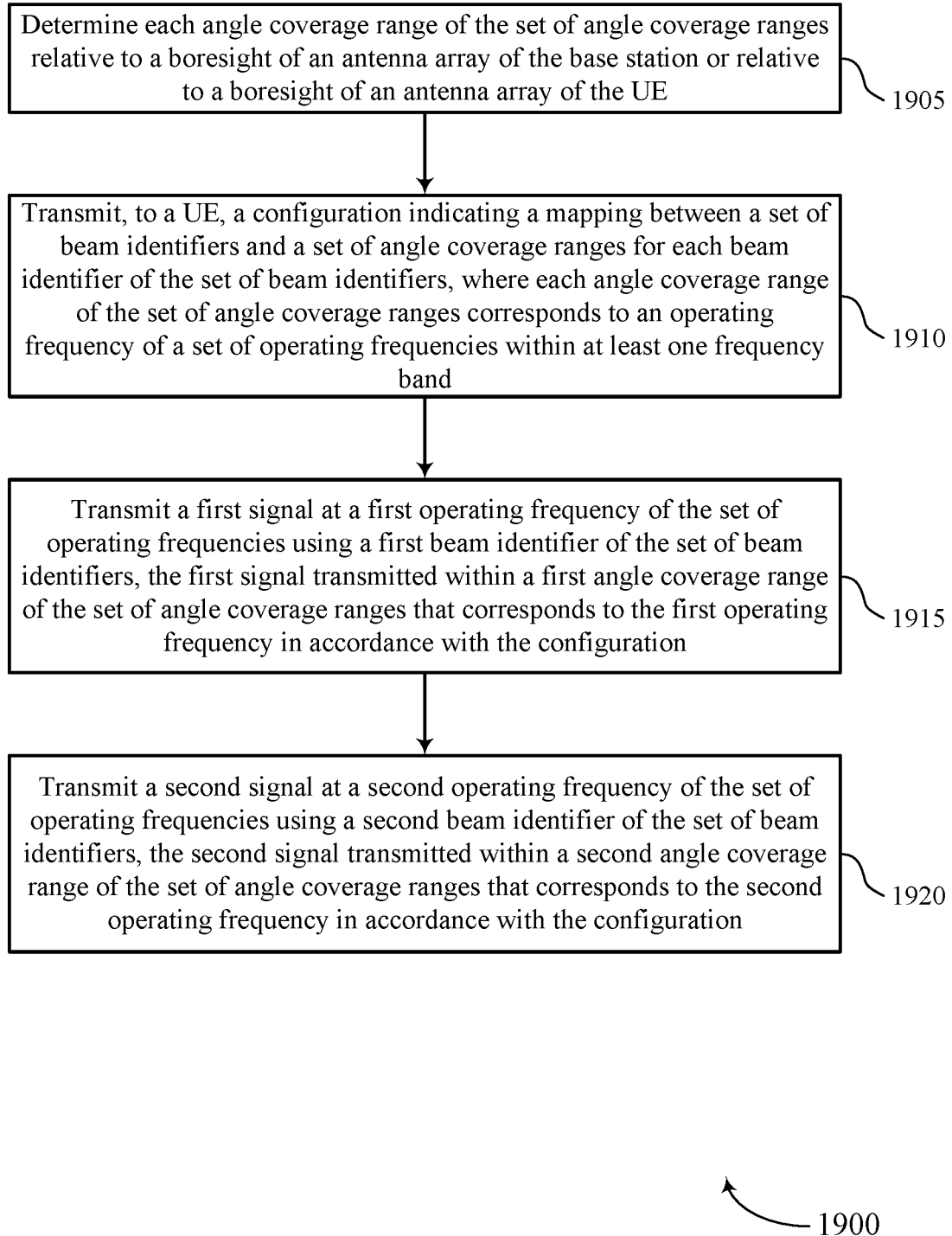

FIG. 19 shows a flowchart illustrating a method 1900 that supports beam correlation across frequency bands in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may determine each angle coverage range of the set of angle coverage ranges relative to a boresight of an antenna array of the base station or relative to a boresight of an antenna array of the UE. The operations of 1905 may be performed according to the methods described herein. In some examples, aspects of the operations of 1905 may be performed by a mapping manager as described with reference to FIGS. 10 through 13.

At 1910, the base station may transmit, to a UE, a configuration indicating a mapping between a set of beam IDs and a set of angle coverage ranges for each beam ID of the set of beam IDs, where each angle coverage range of the set of angle coverage ranges corresponds to an operating frequency of a set of operating frequencies within at least one frequency band. The operations of 1910 may be performed according to the methods described herein. In some examples, aspects of the operations of 1910 may be performed by a configuration transmitter as described with reference to FIGS. 10 through 13.

At 1915, the base station may transmit a first signal at a first operating frequency of the set of operating frequencies using a first beam ID of the set of beam IDs, the first signal transmitted within a first angle coverage range of the set of angle coverage ranges that corresponds to the first operating frequency in accordance with the configuration. The operations of 1915 may be performed according to the methods described herein. In some examples, aspects of the operations of 1915 may be performed by a first frequency component as described with reference to FIGS. 10 through 13.

At 1920, the base station may transmit a second signal at a second operating frequency of the set of operating frequencies using a second beam ID of the set of beam IDs, the second signal transmitted within a second angle coverage range of the set of angle coverage ranges that corresponds to the second operating frequency in accordance with the configuration. The operations of 1920 may be performed according to the methods described herein. In some examples, aspects of the operations of 1920 may be performed by a second frequency component as described with reference to FIGS. 10 through 13.

The following provides an overview of aspects of the present disclosure:

Aspect 1: A method for wireless communications at a UE, comprising: receiving, from a base station, a configuration indicating a mapping between a plurality of beam IDs and a plurality of angle coverage ranges for each beam ID of the plurality of beam IDs, wherein each angle coverage range of the plurality of angle coverage ranges corresponds to an operating frequency of a plurality of operating frequencies within at least one frequency band; determining a frequency switch from a first operating frequency of the plurality of operating frequencies to a second operating frequency of the plurality of operating frequencies; and selecting a second beam ID of the plurality of beam IDs based at least in part on the frequency switch and the mapping, the selected second beam ID corresponding to the second operating frequency and a second angle coverage range based on the mapping.

Aspect 2: The method of aspect 1, further comprising: identifying a set of beam weights for the second beam ID based at least in part on the configuration and the second operating frequency, wherein the set of beam weights is indicated by the configuration; and receiving a signal from the base station based at least in part on the second beam ID and the set of beam weights.

Aspect 3: The method of any of aspects 1 and 2, further comprising: performing a set of beam search measurements associated with the base station based at least in part on the second beam ID; and communicating with the base station using the second beam ID based at least in part on the set of beam search measurements.

Aspect 4: The method of any of aspects 1 through 3, further comprising: preemptively performing a beam failure procedure based at least in part on the configuration and the frequency switch, wherein the second beam ID is selected based at least in part on the beam failure procedure.

Aspect 5: The method of any of aspects 1 through 4, further comprising: determining that the plurality of operating frequencies are supported by the UE; and transmitting an indication of the plurality of operating frequencies to the base station.

Aspect 6: The method of any of aspects 1 through 5, wherein receiving the configuration comprises: receiving an indication of the configuration in a SIB, a MIB, an RRC message, a layer 1 signal, a layer 2 signal, a capability information message, or any combination thereof.

Aspect 7: The method of any of aspects 1 through 6, wherein receiving the configuration comprises: receiving the configuration as part of a start-up or initial acquisition procedure for the UE.

Aspect 8: The method of any of aspects 1 through 7, wherein each angle coverage range of the plurality of angle coverage ranges is based at least in part on a global coordinate system, a local coordinate system, a configured coordinate system, or any combination thereof.

Aspect 9: The method of any of aspects 1 through 8, wherein each angle coverage range of the plurality of angle coverage ranges is relative to a boresight of an antenna array of the base station or a boresight of an antenna array of the UE.

Aspect 10: The method of any of aspects 1 through 9, further comprising: determining a set of logical mappings associated with a set of indices for the plurality of beam IDs and a set of physical mappings associated with the plurality of angle coverage ranges based at least in part on the configuration, wherein the second beam ID is selected based at least in part on the set of logical mappings and the set of physical mappings.

Aspect 11: The method of aspect 10, wherein the set of logical mappings corresponds to a first subset of the plurality of operating frequencies; and the set of physical mappings corresponds to a second subset of the plurality of operating frequencies.

Aspect 12: The method of any of aspects 1 through 11, wherein each of the plurality of beam IDs corresponds to an SSB, a CSI-RS, an SRS, or any combination thereof.

Aspect 13: The method of any of aspects 1 through 12, wherein the at least one frequency band corresponds to a contiguous or non-contiguous set of frequency bands in a millimeter wave frequency range.

Aspect 14: A method for wireless communications at a base station, comprising: transmitting, to a UE, a configuration indicating a mapping between a plurality of beam IDs and a plurality of angle coverage ranges for each beam ID of the plurality of beam IDs, wherein each angle coverage range of the plurality of angle coverage ranges corresponds to an operating frequency of a plurality of operating frequencies within at least one frequency band; transmitting a first signal at a first operating frequency of the plurality of operating frequencies using a first beam ID of the plurality of beam IDs, the first signal transmitted within a first angle coverage range of the plurality of angle coverage ranges that corresponds to the first operating frequency in accordance with the configuration; and transmitting a second signal at a second operating frequency of the plurality of operating frequencies using a second beam ID of the plurality of beam IDs, the second signal transmitted within a second angle coverage range of the plurality of angle coverage ranges that corresponds to the second operating frequency in accordance with the configuration.

Aspect 15: The method of aspect 14, further comprising: determining a set of beam weights for each of the plurality of beam ID; and mapping the set of beam weights to the plurality of angle coverage ranges for the plurality of operating frequencies, wherein the configuration indicates the mapping of the set of beam weights to the plurality of angle coverage ranges for the plurality of operating frequencies.

Aspect 16: The method of any of aspects 14 and 15, further comprising: receiving an indication of the plurality of operating frequencies supported by the UE; and determining the mapping between the plurality of beam IDs and the plurality of angle coverage ranges for each beam ID of the plurality of beam IDs based at least in part on the indication.

Aspect 17: The method of any of aspects 14 through 16, further comprising: determining each angle coverage range of the plurality of angle coverage ranges based at least in part on a global coordinate system, a local coordinate system, a configured coordinate system, or any combination thereof.

Aspect 18: The method of any of aspects 14 through 17, further comprising: determining each angle coverage range of the plurality of angle coverage ranges relative to a boresight of an antenna array of the base station or relative to a boresight of an antenna array of the UE.

Aspect 19: The method of any of aspects 14 through 18, further comprising: determining the plurality of angle coverage ranges for each beam ID of the plurality of beam IDs based at least in part on respective beamwidths for each beam ID.

Aspect 20: The method of any of aspects 14 through 19, further comprising: determining a set of logical mappings associated with a set of indices and a set of physical mappings associated with the plurality of angle coverage ranges, wherein the configuration indicates the set of logical mappings and the set of physical mappings.

Aspect 21: The method of aspect 20, wherein the set of logical mappings corresponds to a first subset of the plurality of operating frequencies; and the set of physical mappings corresponds to a second subset of the plurality of operating frequencies.

Aspect 22: The method of any of aspects 14 through 21, wherein transmitting the configuration comprises: transmitting an indication of the configuration in a SIB, a MIB, an RRC message, a layer 1 signal, a layer 2 signal, a capability information message, or any combination thereof.

Aspect 23: The method of any of aspects 14 through 22, wherein transmitting the configuration comprises: transmitting the configuration as part of a start-up or initial acquisition procedure for the UE.

Aspect 24: The method of any of aspects 14 through 23, wherein each of the plurality of beam IDs corresponds to an SSB, a CSI-RS, an SRS, or any combination thereof.

Aspect 25: The method of any of aspects 14 through 24, wherein the at least one frequency band corresponds to a contiguous or non-contiguous set of frequency bands in a millimeter wave frequency range.

Aspect 26: An apparatus for wireless communications at a UE, comprising a processor; memory coupled with the processor; and instructions stored in the memory and executable by the processor to cause the apparatus to perform a method of any of aspects 1 through 13.

Aspect 27: An apparatus for wireless communications at a UE, comprising at least one means for performing a method of any of aspects 1 through 13.

Aspect 28: A non-transitory computer-readable medium storing code for wireless communications at a UE, the code comprising instructions executable by a processor to perform a method of any of aspects 1 through 13.

Aspect 29: An apparatus for wireless communications at a base station, comprising a processor; memory coupled with the processor; and instructions stored in the memory and executable by the processor to cause the apparatus to perform a method of any of aspects 14 through 25.

Aspect 30: An apparatus for wireless communications at a base station, comprising at least one means for performing a method of any of aspects 14 through 25.

Aspect 31: A non-transitory computer-readable medium storing code for wireless communications at a base station, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a base station, a configuration indicating a mapping between a plurality of beam identifiers and a plurality of angle coverage ranges for each beam identifier of the plurality of beam identifiers, wherein each angle coverage range of the plurality of angle coverage ranges corresponds to an operating frequency of a plurality of operating frequencies within at least one frequency band;

determining a frequency switch from a first operating frequency of the plurality of operating frequencies to a second operating frequency of the plurality of operating frequencies; and selecting a second beam identifier of the plurality of beam identifiers based at least in part on the frequency switch and the mapping, the selected second beam identifier corresponding to the second operating frequency and a second angle coverage range based on the mapping.

2. The method of claim 1, further comprising:

identifying a set of beam weights for the second beam identifier based at least in part on the configuration and the second operating frequency, wherein the set of beam weights is indicated by the configuration; and receiving a signal from the base station based at least in part on the second beam identifier and the set of beam weights.

3. The method of claim 1, further comprising:

performing a set of beam search measurements associated with the base station based at least in part on the second beam identifier; and communicating with the base station using the second beam identifier based at least in part on the set of beam search measurements.

4. The method of claim 1, further comprising:

preemptively performing a beam failure procedure based at least in part on the configuration and the frequency switch, wherein the second beam identifier is selected based at least in part on the beam failure procedure.

5. The method of claim 1, further comprising:

determining that the plurality of operating frequencies are supported by the UE; and transmitting an indication of the plurality of operating frequencies to the base station.

6. The method of claim 1, wherein receiving the configuration comprises:

receiving an indication of the configuration in a system information block, a master information block, a radio resource control message, a layer 1 signal, a layer 2 signal, a capability information message, or any combination thereof.

7. The method of claim 1, wherein receiving the configuration comprises:

receiving the configuration as part of a start-up or initial acquisition procedure for the UE.

8. The method of claim 1, wherein each angle coverage range of the plurality of angle coverage ranges is based at least in part on a global coordinate system, a local coordinate system, a configured coordinate system, or any combination thereof.

9. The method of claim 1, wherein each angle coverage range of the plurality of angle coverage ranges is relative to a boresight of an antenna array of the base station or a boresight of an antenna array of the UE.

10. The method of claim 1, further comprising:

determining a set of logical mappings associated with a set of indices for the plurality of beam identifiers and a set of physical mappings associated with the plurality of angle coverage ranges based at least in part on the configuration, wherein the second beam identifier is selected based at least in part on the set of logical mappings and the set of physical mappings.

11. The method of claim 10, wherein:

the set of logical mappings corresponds to a first subset of the plurality of operating frequencies; and the set of physical mappings corresponds to a second subset of the plurality of operating frequencies.

12. The method of claim 1, wherein each of the plurality of beam identifiers corresponds to a synchronization signal block, a channel state information reference signal, a sounding reference signal, or any combination thereof.

13. The method of claim 1, wherein the at least one frequency band corresponds to a contiguous or non-contiguous set of frequency bands in a millimeter wave frequency range.

14. A method for wireless communications at a base station, comprising:

transmitting, to a user equipment (UE), a configuration indicating a mapping between a plurality of beam identifiers and a plurality of angle coverage ranges for each beam identifier of the plurality of beam identifiers, wherein each angle coverage range of the plurality of angle coverage ranges corresponds to an operating frequency of a plurality of operating frequencies within at least one frequency band;

transmitting a first signal at a first operating frequency of the plurality of operating frequencies using a first beam identifier of the plurality of beam identifiers, the first signal transmitted within a first angle coverage range of the plurality of angle coverage ranges that corresponds to the first operating frequency in accordance with the configuration; and transmitting a second signal at a second operating frequency of the plurality of operating frequencies using a second beam identifier of the plurality of beam identifiers, the second signal transmitted within a second angle coverage range of the plurality of angle coverage ranges that corresponds to the second operating frequency in accordance with the configuration.

15. The method of claim 14, further comprising:

determining a set of beam weights for each of the plurality of beam identifiers; and mapping the set of beam weights to the plurality of angle coverage ranges for the plurality of operating frequencies, wherein the configuration indicates the mapping of the set of beam weights to the plurality of angle coverage ranges for the plurality of operating frequencies.

16. The method of claim 14, further comprising:

receiving an indication of the plurality of operating frequencies supported by the UE; and determining the mapping between the plurality of beam identifiers and the plurality of angle coverage ranges for each beam identifier of the plurality of beam identifiers based at least in part on the indication.

17. The method of claim 14, further comprising:

determining each angle coverage range of the plurality of angle coverage ranges based at least in part on a global coordinate system, a local coordinate system, a configured coordinate system, or any combination thereof.

18. The method of claim 14, further comprising:

determining each angle coverage range of the plurality of angle coverage ranges relative to a boresight of an antenna array of the base station or relative to a boresight of an antenna array of the UE.

19. The method of claim 14, further comprising:
determining the plurality of angle coverage ranges for each beam identifier of the plurality of beam identifiers based at least in part on respective beamwidths for each beam identifier.

20. The method of claim 14, further comprising:
determining a set of logical mappings associated with a set of indices and a set of physical mappings associated with the plurality of angle coverage ranges, wherein the configuration indicates the set of logical mappings and the set of physical mappings.

21. The method of claim 20, wherein:
the set of logical mappings corresponds to a first subset of the plurality of operating frequencies; and
the set of physical mappings corresponds to a second subset of the plurality of operating frequencies.

22. The method of claim 14, wherein transmitting the configuration comprises:
transmitting an indication of the configuration in a system information block, a master information block, a radio resource control message, a layer 1 signal, a layer 2 signal, a capability information message, or any combination thereof.

23. The method of claim 14, wherein transmitting the configuration comprises:
transmitting the configuration as part of a start-up or initial acquisition procedure for the UE.

24. The method of claim 14, wherein each of the plurality of beam identifiers corresponds to a synchronization signal block, a channel state information reference signal, a sounding reference signal, or any combination thereof.

25. The method of claim 14, wherein the at least one frequency band corresponds to a contiguous or non-contiguous set of frequency bands in a millimeter wave frequency range.

26. An apparatus for wireless communications at a user equipment (UE), comprising:
a processor,
memory coupled with the processor; and
instructions stored in the memory and executable by the processor to cause the apparatus to:
receive, from a base station, a configuration indicating a mapping between a plurality of beam identifiers and a plurality of angle coverage ranges for each beam identifier of the plurality of beam identifiers, wherein each angle coverage range of the plurality of angle coverage ranges corresponds to an operating frequency of a plurality of operating frequencies within at least one frequency band;
determine a frequency switch from a first operating frequency of the plurality of operating frequencies to a second operating frequency of the plurality of operating frequencies; and
select a second beam identifier of the plurality of beam identifiers based at least in part on the frequency switch and the mapping, the selected second beam identifier corresponding to the second operating frequency and a second angle coverage range based on the mapping.

27. The apparatus of claim 26, wherein the instructions are further executable by the processor to cause the apparatus to:
identify a set of beam weights for the second beam identifier based at least in part on the configuration and the second operating frequency, wherein the set of beam weights is indicated by the configuration; and
receive a signal from the base station based at least in part on the second beam identifier and the set of beam weights.

28. The apparatus of claim 26, wherein the instructions are further executable by the processor to cause the apparatus to:
perform a set of beam search measurements associated with the base station based at least in part on the second beam identifier; and
communicate with the base station using the second beam identifier based at least in part on the set of beam search measurements.

29. An apparatus for wireless communications at a base station, comprising:
a processor,
memory coupled with the processor; and
instructions stored in the memory and executable by the processor to cause the apparatus to:
transmit, to a user equipment (UE), a configuration indicating a mapping between a plurality of beam identifiers and a plurality of angle coverage ranges for each beam identifier of the plurality of beam identifiers, wherein each angle coverage range of the plurality of angle coverage ranges corresponds to an operating frequency of a plurality of operating frequencies within at least one frequency band;
transmit a first signal at a first operating frequency of the plurality of operating frequencies using a first beam identifier of the plurality of beam identifiers, the first signal transmitted within a first angle coverage range of the plurality of angle coverage ranges that corresponds to the first operating frequency in accordance with the configuration; and
transmit a second signal at a second operating frequency of the plurality of operating frequencies using a second beam identifier of the plurality of beam identifiers, the second signal transmitted within a second angle coverage range of the plurality of angle coverage ranges that corresponds to the second operating frequency in accordance with the configuration.

30. The apparatus of claim 29, wherein the instructions are further executable by the processor to cause the apparatus to:
receive an indication of the plurality of operating frequencies supported by the UE; and
determine the mapping between the plurality of beam identifiers and the plurality of angle coverage ranges for each beam identifier of the plurality of beam identifiers based at least in part on the indication.

* * * * *